United States Patent
Wang et al.

(10) Patent No.: US 12,284,468 B2
(45) Date of Patent: Apr. 22, 2025

(54) BANDWIDTH ADJUSTMENT METHOD, APPARATUS AND SYSTEM, ELECTRONIC DEVICE, AND READABLE STORAGE MEDIUM

(71) Applicant: ZTE CORPORATION, Shenzhen (CN)

(72) Inventors: Dong Wang, Shenzhen (CN); Yuanbin Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 176 days.

(21) Appl. No.: 18/040,716

(22) PCT Filed: Sep. 28, 2021

(86) PCT No.: PCT/CN2021/121405
§ 371 (c)(1),
(2) Date: Feb. 6, 2023

(87) PCT Pub. No.: WO2022/078208
PCT Pub. Date: Apr. 21, 2022

(65) Prior Publication Data
US 2023/0319445 A1    Oct. 5, 2023

(30) Foreign Application Priority Data
Oct. 12, 2020  (CN) .......................... 202011087703.4

(51) Int. Cl.
*H04Q 11/00*        (2006.01)
*H04J 3/16*         (2006.01)
(52) U.S. Cl.
CPC ........ *H04Q 11/0062* (2013.01); *H04J 3/1652* (2013.01); *H04Q 2011/0086* (2013.01)
(58) Field of Classification Search
None
See application file for complete search history.

(56) References Cited

U.S. PATENT DOCUMENTS

| 2003/0025959 A1 | 2/2003 | Nagarajan et al. |
| 2013/0195458 A1* | 8/2013 | Luo ........................ H04J 3/1652 398/66 |

(Continued)

FOREIGN PATENT DOCUMENTS

| CN | 102195859 A | 9/2011 |
| CN | 102215153 A | 10/2011 |

(Continued)

OTHER PUBLICATIONS

Kobayashi "Multi-Bit Rate Passive Double Star System Using Time-Unit Packet", Journal of lightwave technology. Feb. 1, 2001;19(2):150. (Year: 2001).*
International Searching Authority. International Search Report and Written Opinion for PCT Application No. PCT/CN2021/121405 and English translation, mailed Dec. 29, 2021, pp. 1-13.

(Continued)

*Primary Examiner* — Darren E Wolf
(74) *Attorney, Agent, or Firm* — Vivacqua Crane, PLLC

(57) ABSTRACT

A bandwidth adjustment method is disclosed. The source node receives an adjustment command issued by a network management server, all nodes on the path are triggered to adjust a forward transmission bandwidth parameter of the Optical Service Unit (OSU) respectively, so the network management server does not need to issue adjustment commands to all the nodes on the path, thereby simplifying the process of the bandwidth adjustment. Further, the source node enters an adjustment mode corresponding to the OSU, and sequentially sends the first message to the downstream node until the sink node, so that each node on the path enters the adjustment mode corresponding to OSU, and then exits the adjustment mode corresponding to the OSU after performing corresponding adjustment on the forward transmission bandwidth parameter of the OSU, thereby realizing a synchronous adjustment of all nodes on the path based on the adjustment mode corresponding to the OSU.

20 Claims, 11 Drawing Sheets

(56) References Cited

U.S. PATENT DOCUMENTS

2014/0079402 A1    3/2014   Sharma et al.
2019/0288783 A1    9/2019   Zhong

FOREIGN PATENT DOCUMENTS

| | | |
|---|---|---|
| CN | 102368730 A | 3/2012 |
| CN | 103973265 A | 8/2014 |
| CN | 108242969 A | 7/2018 |
| CN | 111464889 A | 7/2020 |
| CN | 112752173 A | 5/2021 |
| EP | 2627043 B1 | 11/2017 |

OTHER PUBLICATIONS

European Patent Office. Extended European Search Report for EP Application No. 21879254.7, mailed Dec. 14, 2023, pp. 1-9.
International Telecommunication Union Standardization Sector. Hitless adjustment of ODUflex (HAO), No. G.7044/Y.1347, Oct. 2011, pp. 1-32.
International Telecommunication Union Telecommunication Standardization Sector. "Considerations on hitless adjustment of OSU bandwidth; C2 02 5," vol. 11/15, Sep. 2020, pp. 1-7.
The State Intellectual Property Office of People's Republic of China. First Office Action for CN Application No. 202011087703.4 and English translation, mailed Sep. 20, 2024, pp. 1-16.
The State Intellectual Property Office of People's Republic of China. First Search Report for CN Application No. 202011087703.4 and English translation, mailed Sep. 15, 2024, pp. 1-4.

* cited by examiner

BANDWIDTH ADJUSTMENT METHOD, APPARATUS AND SYSTEM, ELECTRONIC DEVICE, AND READABLE STORAGE MEDIUM

CROSS-REFERENCE TO RELATED APPLICATION

This application is a national stage filing under 35 U.S.C. § 371 of international application number PCT/CN2021/121405, filed Sep. 28, 2021, which claims priority to Chinese patent application No. 202011087703.4 filed Oct. 12, 2020. The contents of these applications are incorporated herein by reference in their entirety.

TECHNICAL FIELD

Embodiments of the present disclosure relate to the field of optical communication, and in particular to a bandwidth adjustment method, apparatus and system, an electronic device and a computer-readable storage medium.

BACKGROUND

In the definition of an Optical Transport Network (OTN), according to the method of carrying multiple service signals in the payload of an OTN signal, the payload of the OTN signal is divided into N time slots, and then the service signals are carried in one or more time slots of the payload of the OTN signal, with the time slots implemented by byte interpolation.

According to the OTN standard G.709, the minimum time slot granularity of the OTN technology is 1.25G. When this slot granularity is adopted to carry services less than 1.25G, such as Fast Ethernet (FE) services, Synchronous Transfer Module (STM)-1 services, E1 services, and the like, the bandwidth waste is very serious. For example, the E1 services have a bandwidth of 2 megabytes (M), and are carried in time slots of 1.25G, so the bandwidth waste is up to 99%. Therefore, a transmission technology is needed to realize a method of efficiently carrying fine-granularity services in the OTN. A research hot topic in the industry is to utilize Optical Service Units (OSUs) to carry fine-granularity services, and utilize Payload Blocks (PBs) to divide a payload area of an OTN frame, to map the OSUs to the PBs.

At present, the bandwidth adjustment process for the OTN is rather complicated.

SUMMARY

Embodiments of the present disclosure provide a bandwidth adjustment method, apparatus and system, an electronic device and a computer-readable storage medium.

In accordance with a first aspect of the present disclosure, an embodiment provides a bandwidth adjustment method. The method may include: receiving, by a source node, an adjustment command issued by a network management server, entering an adjustment mode corresponding to an Optical Service Unit (OSU), performing a first adjustment on a forward transmission bandwidth parameter of the OSU, and sending a first message to a downstream node of the source node in response to the first adjustment being successful; receiving, by an intermediate node, the first message, entering the adjustment mode corresponding to the OSU, performing a second adjustment on the forward transmission bandwidth parameter of the OSU, and forwarding the first message to a downstream node of the intermediate node in response to the second adjustment being successful; receiving, by a sink node, the first message, entering the adjustment mode corresponding to the OSU, performing a third adjustment on the forward transmission bandwidth parameter of the OSU, and returning a second message to an upstream node of the sink node in response to the third adjustment being successful; receiving, by the intermediate node, the second message, and returning the second message to an upstream node of the intermediate node; receiving, by the source node, the second message, and exiting the adjustment mode corresponding to the OSU; exiting, by the intermediate node, the adjustment mode corresponding to the OSU; and exiting, by the sink node, the adjustment mode corresponding to the OSU.

In accordance with a second aspect of the present disclosure, an embodiment provides a bandwidth adjustment system. The system may include: a source node, configured to receive an adjustment command issued by a network management server, enter an adjustment mode corresponding to an OSU, perform a first adjustment on a forward transmission bandwidth parameter of the OSU, and send a first message to a downstream node of the source node in response to the first adjustment being successful; an intermediate node, configured to receive the first message, enter the adjustment mode corresponding to the OSU, perform a second adjustment on the forward transmission bandwidth parameter of the OSU, and forward the first message to a downstream node of the intermediate node in response to the second adjustment being successful; a sink node, configured to receive the first message, enter the adjustment mode corresponding to the OSU, perform a third adjustment on the forward transmission bandwidth parameter of the OSU, and return a second message to an upstream node of the sink node in response to the third adjustment being successful; the intermediate node is further configured to receive the second message and return the second message to an upstream node of the intermediate node; the source node is further configured to receive the second message and exit the adjustment mode corresponding to the OSU; the intermediate node is further configured to exit the adjustment mode corresponding to the OSU; and the sink is further configured to exit the adjustment mode corresponding to the OSU.

DETAILED DESCRIPTION

Objectives, technical schemes and advantages of the present disclosure will be clearer from a detailed description of a bandwidth adjustment method, apparatus and system, an electronic device and a computer-readable storage medium provided by the present disclosure in conjunction with the accompanying drawings.

Example embodiments will be described fully hereinafter with reference to the accompanying drawings, and the example embodiments may be embodied in different forms and should not be construed as limited to the embodiments set forth herein. On the contrary, these embodiments are provided to make the present disclosure thorough, and will enable those having ordinary skills in the art to fully understand the scope of the present disclosure.

Various embodiments in the present disclosure and various features in the embodiments may be combined with each other if not in collision.

As used herein, the term "and/or" includes any and all combinations of at least one related enumeration entry.

The terms used herein are only used to describe specific embodiments, and are not intended to limit the present disclosure. As used herein, the singular forms "a/an" and "the" are intended to include the plural forms as well, unless the context clearly indicates otherwise. It will be further understood that the terms "includes" and/or "comprises" when used in this description, specify the presence of stated features, integers, steps, operations, elements and/or components, but do not preclude the presence or addition of at least one other features, integers, steps, operations, elements, components and/or groups thereof.

Unless otherwise defined, all terms (including technical and scientific terms) used herein have the identical meanings as commonly understood by those having ordinary skills in the art. It will be further understood that terms, such as those defined in commonly-used dictionaries, should be interpreted as having meanings consistent with their meanings in some cases and in the background of the present disclosure, and will not be interpreted as having idealized or over-formal meanings, unless explicitly so defined herein.

Figure 1:
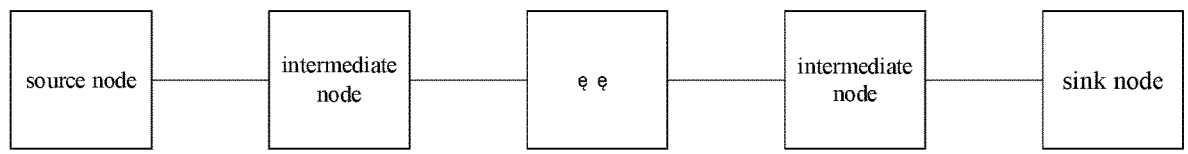
FIG. 1 is a schematic diagram of nodes included in a path in an embodiment of the present disclosure.

In the embodiment of the present disclosure, as shown in FIG. 1, a start point of each path is a source node, an end point is a sink node, and at least one intermediate node is located between the start point and the end point. Due to the bidirectionality of path transmission, a client service PacKet (PKT) can be transmitted from the source node to the sink node, or from the sink node to the source node.

The process of transmitting the client service packet from the source node to the sink node is described as follows.

When the source node has a client service to be sent, a client-side module 1 of the source node is configured to map a client service packet to an Optical Service Unit (OSU), and a line-side module 1 of the source node is configured to map the OSU to an Optical Data Unit (ODU) k, and send the ODUk to a downstream node (i.e., an intermediate node adjacent to the source node and close to the side of the sink node on the path).

The intermediate node is configured to receive the ODUk, acquire the OSU from the ODUk via a line-side module 1 of the intermediate node, remap the OSU to the ODUk via a line-side module 2 of the intermediate node, and send the ODUk to a downstream node (i.e., an intermediate node adjacent to this intermediate node and close to the side of the sink node on the path; or a sink node).

The sink node is configured to receive the ODUk, acquire the OSU from the ODUk via a line-side module 1 of the sink node, and acquire the client service packet from the OSU via a client-side module 1 of the sink node.

The process of transmitting the client service packet from the sink node to the source node is described as follows.

When the sink node has a client service to be sent, a client-side module 2 of the sink node is configured to map a client service packet to the OSU, map the OSU to the ODUk via a line-side module 2 of the sink node, and send the ODUk to an upstream node (i.e., an intermediate node adjacent to the sink node and close to the side of the source node on the path);

The intermediate node is configured to receive the ODUk, acquire the OSU from the ODUk via a line-side module 3 of the intermediate node, remap the OSU to the ODUk via a line-side module 4 of the intermediate node, and send the ODUk to an upstream node (i.e., an intermediate node adjacent to this intermediate node and close to the side of the source node on the path; or the source node).

The source node is configured to receive the ODUk, acquire the OSU from the ODUk via a line-side module 2 of the source node, and acquire the client service packet from the OSU via a client-side module 2 of the source node.

In the embodiment of the present disclosure, an upstream node of a certain node on the path refers to a node adjacent to the certain node and close to the side of the source node on the path (which may be the source node or an intermediate node); and a downstream node of a certain node on the path refers to a node adjacent to the certain node and close to the side of the sink node on the path (which may be the sink node or an intermediate node).

For example, assuming that the path includes a source node, an intermediate node 1, an intermediate node 2 and a sink node, a downstream node of the source node is the intermediate node 1, an upstream node of the intermediate node 1 is the source node, a downstream node of the intermediate node 1 is the intermediate node 2, an upstream node of the intermediate node 2 is the intermediate node 1, a downstream node of the intermediate node 2 is the sink node, and an upstream node of the sink node is the intermediate node 2.

The following description is about a system side (i.e., multi-side interaction), a source node side, an intermediate node side and a sink node side.

Figure 2:
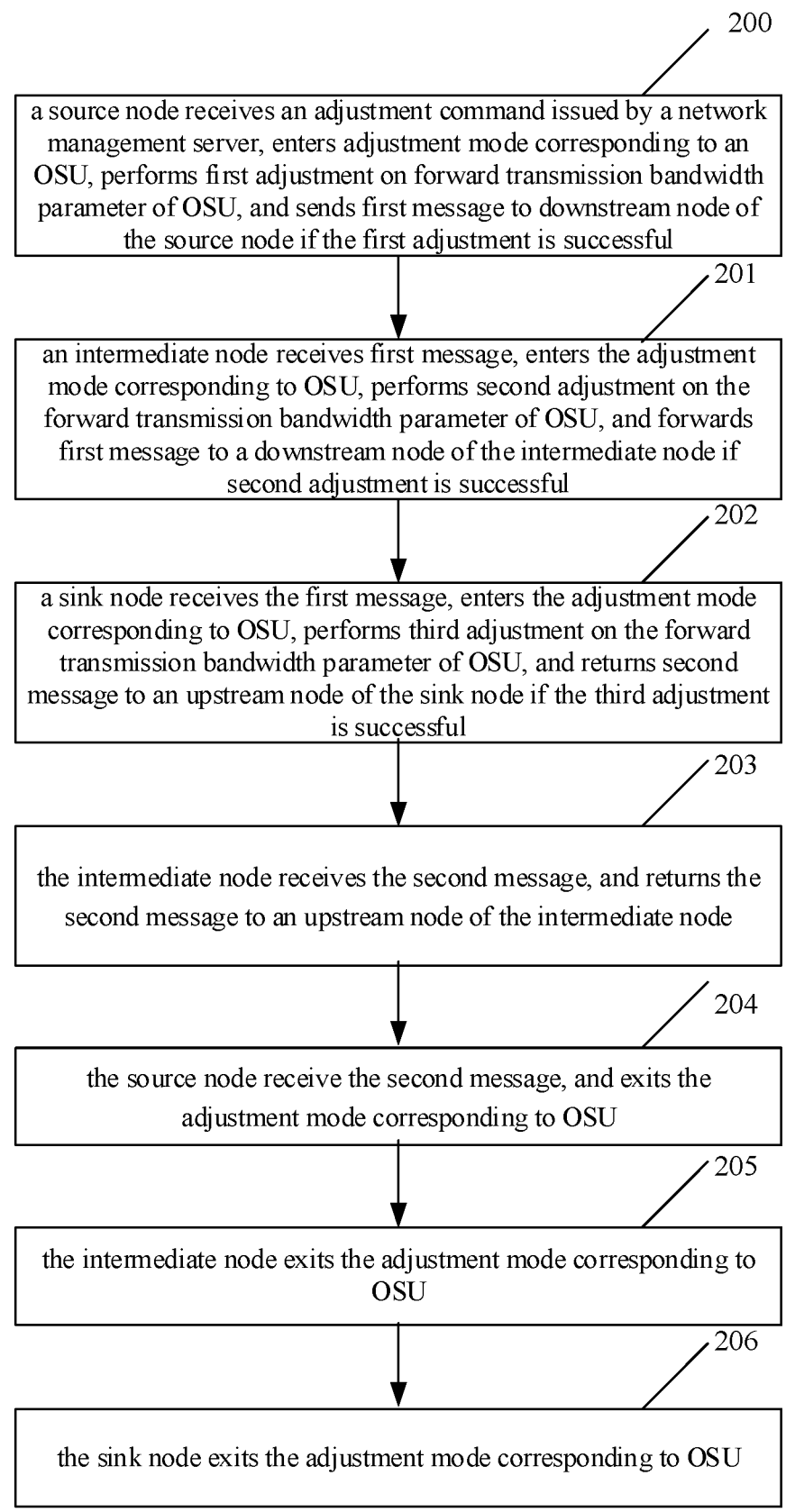
FIG. 2 is a flowchart of a bandwidth adjustment method applied to a system side provided by an embodiment of the present disclosure.

FIG. 2 is a flowchart of a bandwidth adjustment method applied to a system side provided by an embodiment of the present disclosure.

In a first aspect of present disclosure, referring to FIG. 1, an embodiment of the present disclosure provides a bandwidth adjustment method, including the following steps.

At S200, a source node is configured to receive an adjustment command issued by a network management server, enter an adjustment mode corresponding to an OSU, perform a first adjustment on a forward transmission bandwidth parameter of the OSU, and send a first message to a downstream node of the source node if the first adjustment is successful.

In some embodiments, the first message is used to request an adjustment on the forward transmission bandwidth parameter of the OSU.

In some embodiments, if there is at least one intermediate node between the source node and the sink node, a downstream node of the source node is an intermediate node adjacent to the source node and close to the side of the sink node on the path; and if there is no intermediate node between the source node and the sink node, the downstream node of the source node is the sink node.

In some embodiments, the first message is used to request to increase the forward transmission bandwidth parameter of the OSU. In other embodiments, the first message is used to request to decrease the forward transmission bandwidth parameter of the OSU. That is, the adjustment may be an increase or a decrease.

In some embodiments, different command names may be adopted to distinguish between a request to increase the forward transmission bandwidth parameter of the OSU and a request to decrease the forward transmission bandwidth parameter of the OSU. For example, a bandwidth increase request message (such as INC_REQ) is used to indicate a request to increase the forward transmission bandwidth parameter of the OSU, and a bandwidth decrease request command (such as DEC_REQ) is used to indicate a request to decrease the forward transmission bandwidth parameter of the OSU. In other embodiments, the same command name may be used to indicate a request to increase the forward transmission bandwidth parameter of the OSU and a request to decrease the forward transmission bandwidth parameter of the OSU, and a command parameter is defined to indicate whether it is a request to increase the forward transmission bandwidth parameter of the OSU or a request to decrease the forward transmission bandwidth parameter of the OSU. For example, ADJ_REQ is used to indicate a request to adjust the forward transmission bandwidth parameter of OSU, and a command parameter A is used in the ADJ_REQ to indicate whether it is a request to increase the forward transmission bandwidth parameter of the OSU or a request to decrease the forward transmission bandwidth parameter of the OSU. For example, the command parameter A may have a first value (such as 1) which indicates a request increase the forward transmission bandwidth parameter of the OSU, and a second value (such as 2) which indicates a request to decrease the forward transmission bandwidth parameter of the OSU.

Of course, other means may also be used to distinguish between a request to increase the forward transmission bandwidth parameter of the OSU and a request to decrease the forward transmission bandwidth parameter of the OSU. Specific implementations are not used to limit the protection scope of the embodiments of the present disclosure.

In some embodiments, the first message may include a forward transmission target bandwidth of an OSU.

In some embodiments, if the first message does not include the forward transmission target bandwidth of the OSU, the forward transmission target bandwidth of the OSU may be preset, or may be obtained in other means in advance.

In some embodiments, the first message may further include a forward transmission original bandwidth of an OSU, that is, a forward transmission bandwidth of a current OSU.

In some embodiments, the first message may be sent to a downstream node of the source node by means of in-band channel associated overhead. That is, the first message is carried in the overhead of an OSU frame transmitted forward. The OSU frame may be an OSU data frame carrying a client service packet or an OSU management frame not carrying client service data. The specific carrying mode is not intended to limit the protection scope of the embodiments of the present disclosure. By sending the first message to the downstream node on the path by means of in-band channel associated overhead, a lossless adjustment of the bandwidth can be achieved, that is, the adjustment of the bandwidth parameter can be achieved without affecting client service transmission.

It should be noted that the first message may be mapped to the overhead of the OSU frame prior to mapping the client service packet to the OSU frame, or the first message may be mapped to the overhead of the OSU frame in the process of mapping the client service packet to the OSU frame, or the first message may be mapped to the overhead of the OSU frame after mapping the client service packet to the OSU frame, which will not be limited in the embodiment of the present disclosure. The embodiment of the present disclosure emphasizes carrying the first message in the overhead of the OSU frame.

It should be noted that in the embodiment of the present disclosure, a message between any two adjacent nodes may be transmitted by means of in-band channel associated overhead.

In some embodiments, the source node is configured to perform a first adjustment on a forward transmission bandwidth parameter of the OSU includes at least one of the following cases.

The source node is configured to check a parameter of the adjustment command.

The source node is configured to detect whether forward link bandwidth resources are sufficient.

The source node is configured to determine whether it is in a forward adjustment enabling state.

The source node is configured to adjust the number of payload blocks corresponding to the OSU in a single forward transmission cycle.

The source node is configured to reserve the adjusted number of the payload blocks.

The source node is configured to adjust a forward transmission bandwidth of the OSU.

In some embodiments, the first adjustment being successful includes at least one of the following cases.

The checking of the parameter of the adjustment command is passed by the source node.

Sufficient forward link bandwidth resources is detected by the source node.

The source node determines that it is in a forward adjustment enabling state.

The number of payload blocks corresponding to the OSU in a single forward transmission cycle is successfully adjusted by the source node.

The adjusted number of the payload blocks is successfully reserved by the source node.

A forward transmission bandwidth of the OSU is successfully adjusted by the source node.

In some embodiments, the parameter of the adjustment command may include the forward transmission target bandwidth, the forward transmission original bandwidth, or the like.

In some embodiments, when checking the parameter of the adjustment command, it is checked whether a value of the parameter of the adjustment command is within a reasonable range. If the value of the parameter of the adjustment command is within a preset value range, the checking of the parameter of the adjustment command passes; otherwise, the checking of the parameter of the adjustment command fails.

In some embodiments, it can be judged whether the link bandwidth resources are sufficient according to the forward transmission target bandwidth of the OSU. For example, if an increase in the forward transmission bandwidth parameter of the OSU is greater than the remaining amount of the link bandwidth, it means that the link bandwidth resources are insufficient; and if the increase in the forward transmission bandwidth parameter of the OSU is less than or equal to the remaining amount of the link bandwidth, it means that the link bandwidth resources are sufficient.

In some embodiments, the number of PBs corresponding to the OSU in a single transmission cycle can be adjusted according to the forward transmission target bandwidth of the OSU. For example, the forward transmission target bandwidth may be divided by the bandwidth of a single PB to obtain the adjusted number of PBs required, and then an adjustment in the number of PBs can be determined according to the adjusted number of PBs required and the existing number of PBs.

At S201, an intermediate node is configured to receive the first message, enter the adjustment mode corresponding to the OSU, perform a second adjustment on the forward transmission bandwidth parameter of the OSU, and forward the first message to a downstream node of the intermediate node if the second adjustment is successful.

In some embodiments, if there is at least one intermediate node between the source node and the intermediate node, an upstream node of the intermediate node is an intermediate node adjacent to the intermediate node and close to the side of the source node on the path; and if there is no intermediate node between the source node and the intermediate node, the upstream node of the intermediate node is the source node.

In some embodiments, if there is at least one intermediate node between the intermediate node and the sink node, a downstream node of the intermediate node is an intermediate node adjacent to the intermediate node and close to the side of the sink node on the path; and if there is no intermediate node between the intermediate node and the sink node, the downstream node of the intermediate node is the sink node.

In some embodiments, the intermediate node is configured to perform a second adjustment on the forward transmission bandwidth parameter of the OSU. This process includes at least one of the following cases.

The intermediate node is configured to check a parameter of the first message.

The intermediate node is configured to detect whether forward link bandwidth resources are sufficient.

The intermediate node is configured to determine whether it is in a forward adjustment enabling state.

The intermediate node is configured to adjust the number of payload blocks corresponding to the OSU in a single forward transmission cycle.

The intermediate node is configured to reserve the adjusted number of the payload blocks.

In some embodiments, the second adjustment being successful includes at least one of the following cases.

The checking of the parameter of the first message is passed by the intermediate node.

Sufficient forward link bandwidth resources is detected by the intermediate node.

The intermediate nodes determines that it is in a forward adjustment enabling state.

The number of payload blocks corresponding to the OSU in a single forward transmission cycle is successfully adjusted by the intermediate node.

The adjusted number of the payload blocks is successfully reserved by the intermediate node.

In some embodiments, the parameter of the first message may include the forward transmission target bandwidth, the forward transmission original bandwidth, or the like.

In some embodiments, when checking the parameter of the first message, it is checked whether a value of the parameter of the first message is within a reasonable range. If the value of the parameter of the first message is within a preset value range, the checking of the parameter of the first message passes; otherwise, the checking of the parameter of the first message fails. In some embodiments, because when the intermediate node enters the adjustment mode corresponding to the OSU to perform a second adjustment on the forward transmission bandwidth parameter of the OSU, a certain latency will be generated, in order to ensure the normal transmission of client services, the intermediate node needs to be configured to terminate the first message after receiving the first message, then enter the adjustment mode corresponding to the OSU, perform a second adjustment on the forward transmission bandwidth parameter of the OSU, and send the first message to a downstream node.

In some embodiments, because the first message is transmitted from the source node to the sink node in sequence by means of in-band channel associated overhead, the intermediate node be configured to terminate the first message means that the intermediate node is configured to delete the first message carried in the overhead of the OSU frame, and then insert the first message again into the overhead of a next OSU frame after the forward transmission bandwidth parameter of the OSU is adjusted by the intermediate node. In this way, it is ensured that the transmission of the client services is not affected by the bandwidth adjustment.

At S202, the sink node is configured to receive the first message, enter the adjustment mode corresponding to the OSU, perform a third adjustment on the forward transmission bandwidth parameter of the OSU, and return a second message to an upstream node of the sink node if the third adjustment is successful.

In some embodiments, the first message is used to acknowledge to adjust the forward transmission bandwidth parameter of the OSU.

In some embodiments, the sink node is configured to perform a third adjustment on the forward transmission bandwidth parameter of the OSU. This process includes at least one of the following cases.

The sink node is configured to check a parameter of the first message.

The sink node is configured to determine whether it is in a forward adjustment enabling state.

The sink node is configured to adjust a bandwidth limitation of a forward sending interface.

In some embodiments, the third adjustment being successful includes at least one of the following cases.

The checking of the parameter of the first message is passed by the sink node, t;

The sink node determines that it is in a forward adjustment enabling state.

A bandwidth limitation of a forward sending interface is successfully adjusted by the sink node.

In some embodiments, adjusting the bandwidth limitation of the forward sending interface of the OSU means adjusting the bandwidth limitation of the forward sending interface of the OSU to the forward transmission target bandwidth of the OSU.

In some embodiments, the forward sending interface of the OSU refers to an interface through which the sink node is configured to send the OSU to the client.

In some embodiments, if there is at least one intermediate node between the source node and the sink node, an upstream node of the sink node is an intermediate node adjacent to the sink node and close to the side of the source node on the path; and if there is no intermediate node between the source node and the sink node, the upstream node of the sink node is the source node.

In some embodiments, the second message is used to acknowledge to increase the forward transmission bandwidth parameter of the OSU. In other embodiments, the second message is used to acknowledge to decrease the forward transmission bandwidth parameter of the OSU.

In some embodiments, different command names may be used to distinguish between an acknowledgment to increase the forward transmission bandwidth parameter of the OSU and an acknowledgment to decrease the forward transmission bandwidth parameter of the OSU. For example, INC_ACK (bandwidth increase acknowledgement command) is used to indicate an acknowledgment to increase the forward transmission bandwidth parameter of the OSU, and DEC_ACK (bandwidth decrease acknowledgement command) is used to indicate an acknowledgment to decrease the forward transmission bandwidth parameter of the OSU. In other embodiments, an identical command name may be used to indicate an acknowledgment to increase the forward transmission bandwidth parameter of the OSU and an acknowledgment to decrease the forward transmission bandwidth parameter of the OSU, and a command parameter is defined to indicate whether it is an acknowledgment to increase the forward transmission bandwidth parameter of the OSU or an acknowledgment to decrease the forward transmission bandwidth parameter of the OSU. For example, ADJ_ACK is used to indicate an acknowledgment to adjust the forward transmission bandwidth parameter of the OSU, and a command parameter B is used in the ADJ_ACK to indicate whether it is an acknowledgment to increase the forward transmission bandwidth parameter of the OSU or an acknowledgment to decrease the forward transmission bandwidth parameter of the OSU. For example, the command parameter B may have a third value (such as 1) which indicates an acknowledgment to increase the forward transmission bandwidth parameter of the OSU, and a fourth value (such as 2) which indicates an acknowledgment to decrease the forward transmission bandwidth parameter of the OSU.

Of course, other means may be used to distinguish between an acknowledgment to increase the forward transmission bandwidth parameter of the OSU or an acknowledgment to decrease the forward transmission bandwidth parameter of the OSU. The specific implementation mode is not used to limit the protection scope of the embodiments of the present disclosure.

In some embodiments, the second message may be returned to the upstream node by means of in-band channel associated overhead. That is, the second message is carried in the overhead of an OSU frame transmitted reversely. The OSU frame may be an OSU data frame carrying a client service packet or an OSU management frame not carrying client service data. The specific carrying mode is not intended to limit the protection scope of the embodiments of the present disclosure. A lossless adjustment of the bandwidth can be achieved by returning the second message to the upstream node by means of in-band channel associated overhead, that is, the adjustment of the bandwidth can be achieved without affecting client service transmission.

It should be noted that the second message may be mapped to the overhead of the OSU frame prior to mapping the client service packet to the OSU frame, or the second message may be mapped to the overhead of the OSU frame in the process of mapping the client service packet to the OSU frame, or the second message may be mapped to the overhead of the OSU frame after mapping the client service packet to the OSU frame, which will not be limited in the embodiment of the present disclosure. The embodiment of the present disclosure emphasizes carrying the second message in the overhead of the OSU frame.

In some embodiments, because when the sink node enters the adjustment mode corresponding to the OSU to perform a third adjustment on the forward transmission bandwidth parameter of the OSU, a certain latency will be generated, in order to ensure the normal transmission of client services, the sink node needs to be configured to terminate the first message after receiving the first message, then enter the adjustment mode corresponding to the OSU, perform a third adjustment on the forward transmission bandwidth parameter of the OSU, and return the second message to the upstream node.

In some embodiments, because the first message is transmitted from the source node to the sink node in sequence by means of in-band channel associated overhead, the sink node being configured to terminate the first message means that the sink node is configured to delete the first message carried in the overhead of the OSU frame, and then insert the second message into the overhead of a next OSU frame after the sink node is configured to enter the adjustment mode corresponding to the OSU and perform a third adjustment on the forward transmission bandwidth parameter of the OSU. In this way, it is ensured that the transmission of the client services is not affected by the bandwidth adjustment.

At S203, the intermediate node is configured to receive the second message, and return the second message to an upstream node of the intermediate node.

At S204, the source node is configured to receive the second message, and exit the adjustment mode corresponding to the OSU.

At S205, the intermediate node is configured to exit the adjustment mode corresponding to the OSU.

At S206, the sink node is configured to exit the adjustment mode corresponding to the OSU.

According to the bandwidth adjustment method, when the source node receives an adjustment command issued by a network management server, all nodes on the path are triggered to adjust a forward transmission bandwidth parameter of the OSU respectively, so the network management server does not need to issue adjustment commands to all the nodes on the path, thereby simplifying the process of the bandwidth adjustment. Further, the source node is configured to enter an adjustment mode corresponding to the OSU, and sequentially send the first message to the downstream node until the sink node, so that each node on the path is configured to enter the adjustment mode corresponding to OSU, and then exit the adjustment mode corresponding to the OSU after performing corresponding adjustment on the forward transmission bandwidth parameter of the OSU, thereby realizing a synchronous adjustment of all nodes on the path based on the adjustment mode corresponding to the OSU.

In some embodiments, after the second message is received by the intermediate node, and before the second message is returned the intermediate node to an upstream node of the intermediate node, the method further includes the following steps.

The intermediate node is configured to perform a fourth adjustment on the forward transmission bandwidth parameter of the OSU, and continue to perform the step of returning the second message to the upstream node of the intermediate node if the fourth adjustment is successful.

After the source node receives the second message, and before the source node exits the adjustment mode corresponding to the OSU, the method further includes the following steps.

The source node is configured to perform a fifth adjustment on the forward transmission bandwidth parameter of the OSU, and continue to perform the step of exiting the adjustment mode corresponding to the OSU if the fifth adjustment is successful.

In some embodiments, the intermediate node is configured to perform a fourth adjustment on the forward transmission bandwidth parameter of the OSU. This process includes at least one of the following cases.

The intermediate node is configured to check a parameter of the second message.

The intermediate node is configured to detect whether forward link bandwidth resources are sufficient.

The intermediate node is configured to determine whether it is in a forward transmission bandwidth adjustment enabling state.

The intermediate node is configured to adjust the number of payload blocks corresponding to the OSU in a single forward transmission cycle.

In some embodiments, the fourth adjustment being successful includes at least one of the following cases.

The checking of the parameter of the second message is passed by the intermediate node.

Sufficient forward link bandwidth resources is detected by the intermediate node.

The intermediate node determines that it is in a forward transmission bandwidth adjustment enabling state; or The number of payload blocks corresponding to OSUs in a single forward transmission cycle is successfully adjusted by the intermediate node.

In some embodiments, the source node is configured to perform a fifth adjustment on the forward transmission bandwidth parameter of the OSU. This process includes at least one of the following cases.

The source node is configured to check a parameter of the second message.

The source node is configured to detect whether forward link bandwidth resources are sufficient.

The source node is configured to determine whether it is in a forward transmission bandwidth adjustment enabling state.

The source node is configured to adjust the number of payload blocks corresponding to the OSU in a single forward transmission cycle.

The source node is configured to adjust a forward transmission bandwidth of the OSU.

In some embodiments, the fifth adjustment being successful includes at least one of the following cases.

The checking of the parameter of the second message is passed by the source node.

Sufficient forward link bandwidth resources is detected by the source node.

The source node determines that it is in a forward transmission bandwidth adjustment enabling state.

The number of payload blocks corresponding to the OSU in a single forward transmission cycle is successfully adjusted by the source node.

A forward transmission bandwidth of the OSU is successfully adjusted by the source node.

In some embodiments, sending a first message to a downstream node of the source node includes the following steps. The first message is periodically sent to the downstream node of the source node.

Returning a second message to an upstream node of the sink node includes the following step. The second message is periodically returned to the upstream node of the sink node.

After the source node exits the adjustment mode, the method further includes the following step. The source node is configured to stop sending the first message.

After the sink node returns a second message to an upstream node of the sink node, the method further includes the following step. If the first message is not received by the sink node within a preset time, the sink node is configured to stop returning the second message to the upstream node of the sink node, and exit the adjustment mode.

After the intermediate node returns the second message to an upstream node of the intermediate node, the method further includes the following step. If the second message is not received by the intermediate node within a preset time, the intermediate node is configured to exit the adjustment mode.

It should be noted that the purpose of periodically sending the first message by the source node is to inform other nodes on the path that the current adjustment is not finished, so that other nodes will not exit the adjustment mode. In this way, the states of all nodes on the path can be kept consistent, and no adjustment state confusion occurs. Similarly, the purpose of periodically sending the second message by the sink node is to inform other nodes on the path that the current adjustment is not finished, so that other nodes will not exit the adjustment mode. In this way, the states of all nodes on the path can be kept consistent, and no adjustment state confusion occurs.

It should be noted that although the source node is configured to periodically send the first message, the intermediate node is configured to only perform the second adjustment when receiving the first message for the first time, and the sink node is configured to only perform the third adjustment when receiving the first message for the first time.

It should be noted that although the sink node is configured to periodically send the second message, the intermediate node is configured to only perform the fourth adjustment when receiving the second message for the first time, and the source node is configured to only perform the fifth adjustment when receiving the second message for the first time.

In some embodiments, if the first adjustment or the fifth adjustment fails, the method further includes the following steps.

The source node is configured to report an adjustment result to the network management server, and exit the adjustment mode corresponding to the OSU, where the adjustment result is used to indicate that the adjustment fails.

In some embodiments, the adjustment result may include a failure reason; or may not include any information.

For example, if the checking of the parameter of the adjustment command fails, the failure reason included in the adjustment result reported by the source node to the network management server may be a parameter error of the adjustment command; and if the link bandwidth resources are insufficient, the failure reason included in the adjustment result reported by the source node to the network management server may be insufficient link bandwidth resources.

In some embodiments, if the second adjustment or the fourth adjustment fails, the method further includes the following steps.

The intermediate node is configured to report an adjustment result to the network management server, where the adjustment result is used to indicate that the adjustment fails.

The intermediate node is configured to send a third message to the source node, where the third message is used to indicate that a bandwidth adjustment error occurs.

The source node is configured to receive the third message, perform a first adjustment rollback operation on the forward transmission bandwidth parameter of the OSU, and send a fourth message to the downstream node of the source node.

The intermediate node is configured to receive the fourth message, and send the fourth message to the downstream node of the intermediate node.

The sink node is configured to receive the fourth message, and return a fifth message to the upstream node of the sink node.

The intermediate node is configured to receive the fifth message, and return the fifth message to the upstream node of the intermediate node;

The source node is configured to receive the fifth message, and exit the adjustment mode corresponding to the OSU;

The intermediate node is configured to exit the adjustment mode corresponding to the OSU.

The sink node is configured to exit the adjustment mode corresponding to the OSU.

In some embodiments, the fourth message is used to indicate to perform an adjustment rollback operation, and the fifth message is used to acknowledge to perform an adjustment rollback operation.

In some embodiments, if the third adjustment fails, the method further includes the following steps.

The sink node is configured to report an adjustment result to the network management server, where the adjustment result is used to indicate that the adjustment fails.

The sink node is configured to send a third message to the source node, where the third message is used to indicate that an adjustment error occurs.

The source node is configured to receive the third message, perform a first adjustment rollback operation on the forward transmission bandwidth parameter of the OSU, and send a fourth message to the downstream node of the source node.

The intermediate node is configured to receive the fourth message, perform a second adjustment rollback operation on the forward transmission bandwidth parameter of the OSU, and send the fourth message to the downstream node of the intermediate node.

The sink node is configured to receive the fourth message, and return a fifth message to the upstream node of the sink node.

The intermediate node is configured to receive the fifth message, and return the fifth message to the upstream node of the intermediate node.

The source node is configured to receive the fifth message, and exit the adjustment mode corresponding to the OSU.

The intermediate node is configured to exit the adjustment mode corresponding to the OSU.

The sink node is configured to exit the adjustment mode corresponding to the OSU.

In some embodiments, sending a fourth message to the downstream node of the source node includes the following step. The fourth message is periodically sent to the downstream node of the source node.

Returning the fifth message to the upstream node of the sink node includes the following step. The fifth message is periodically returned to the upstream node of the sink node.

After the intermediate node returns the fifth message to the upstream node of the intermediate node, the method further includes the following step. If the fifth message is not received within a preset time, the intermediate node is configured to exit the adjustment mode corresponding to the OSU.

After the sink node returns a fifth message to the upstream node of the sink node, the method further includes the following step. If the fourth message is not received within a preset time, the sink node is configured to exit the adjustment mode corresponding to the OSU.

It should be noted that the purpose of periodically sending the fourth message by the source node is to inform other nodes on the path that the current adjustment is not finished, so that other nodes will not exit the adjustment mode. In this way, the states of all nodes on the path can be kept consistent, and no adjustment state confusion occurs. Similarly, the purpose of periodically sending the fifth message by the sink node is to inform other nodes on the path that the current adjustment is not finished, so that other nodes will not exit the adjustment mode. In this way, the states of all nodes on the path can be kept consistent, and no adjustment state confusion occurs.

It should be noted that although the source node is configured to periodically send the fourth message, the intermediate node is configured to only perform the second adjustment rollback operation when receiving the fourth message for the first time, and the sink node only performs the third adjustment rollback operation when receiving the fourth message for the first time.

It should be noted that if the source node receives the third message sent by the downstream node of the source node, the source node will not receive the second message returned by the downstream node of the source node. Similarly, if the source node receives the second message returned by the downstream node of the source node, the source node will not receive the third message sent by the downstream node of the source node.

In some embodiments, the third message may be a fault indication command (such as ERR) or may have other names, and the specific names are not intended to limit the protection scope of the embodiments of the present disclosure.

In some embodiment, the third message includes at least one of the following items.

A state indicates that the adjustment fails.

A type indicates that the adjustment fails.

Node information indicates that the adjustment fails.

In some embodiments, the type indicating that the adjustment fails includes at least one of the following cases.

Parameter check fails. Link bandwidth resources is insufficient. It is in forward transmission bandwidth adjustment non-enabling state. Adjustment of the number of payload blocks fails. Adjustment of the bandwidth limitation of the forward sending interface fails.

In some embodiments, the fourth message may be a bandwidth rollback request command (such as ROLLBACK_REQ) or may have other names, and the specific names are not intended to limit the protection scope of the embodiments of the present disclosure.

In some embodiments, the fifth message may be a bandwidth rollback acknowledgement command (such as ROLLBACK_ACK) or may have other names, and the specific names are not intended to limit the protection scope of the embodiments of the present disclosure.

In some embodiments, the fourth message may be sent to the downstream node by means of in-band channel associated overhead. That is, the fourth message is carried in the overhead of an OSU frame transmitted forward. The OSU frame may be an OSU data frame carrying a client service packet or an OSU management frame not carrying client service data. The specific carrying mode is not intended to limit the protection scope of the embodiments of the present disclosure. A lossless adjustment of the bandwidth can be achieved by sending the fourth message to the downstream node by means of in-band channel associated overhead, that is, the adjustment of the bandwidth can be achieved without affecting client service transmission.

It should be noted that the fourth message may be mapped to the overhead of the OSU frame prior to mapping the client service packet to the OSU frame, or the fourth message may be mapped to the overhead of the OSU frame in the process of mapping the client service packet to the OSU frame, or the fourth message may be mapped to the overhead of the OSU frame after mapping the client service packet to the OSU frame, which will not be limited in the embodiment of the present disclosure. The embodiment of the present disclosure emphasizes carrying the fourth message in the overhead of the OSU frame.

In some embodiments, the fifth message may be returned to the upstream node by means of in-band channel associated overhead. That is, the fifth message is carried in the overhead of an OSU frame transmitted reversely. The OSU frame may be an OSU data frame carrying a client service packet or an OSU management frame not carrying client service data. The specific carrying mode is not intended to limit the protection scope of the embodiments of the present disclosure. A lossless adjustment of the bandwidth can be achieved by returning the fifth message to the upstream node by means of in-band channel associated overhead, that is, the adjustment of the bandwidth can be achieved without affecting client service transmission.

It should be noted that the fifth message may be mapped to the overhead of the OSU frame prior to mapping the client service packet to the OSU frame, or the fifth message may be mapped to the overhead of the OSU frame in the process of mapping the client service packet to the OSU frame, or the fifth message may be mapped to the overhead of the OSU frame after mapping the client service packet to the OSU frame, which will not be limited in the embodiment of the present disclosure. The embodiment of the present disclosure emphasizes carrying the fifth message in the overhead of the OSU frame.

In some embodiments, the method further includes the following steps.

After the source node enters the adjustment mode and prior to exits the adjustment mode, there is a link failure determined by the source node, and the source node is configured to exit the adjustment mode corresponding to the OSU.

After the intermediate node enters the adjustment mode and prior to exits the adjustment mode, there is a link failure determined by the intermediate node, and the intermediate node is configured to exit the adjustment mode corresponding to the OSU.

After the sink node enters the adjustment mode and prior to exits the adjustment mode, there is a link failure determined by the sink node, and the sink node is configured to exit the adjustment mode corresponding to the OSU.

In some embodiment, the link failure includes a forward link failure and a reverse link failure.

In some embodiments, whether there is a link failure can be determined according to whether a failure alarm is received. For example, if a failure alarm is received, it is determined that there is a link failure; and if a failure alarm is not received, it is determined that there is no link failure.

In some embodiments, before the source node exits the adjustment mode corresponding to the OSU, the method further includes the following step. The source node is configured to perform a first adjustment rollback operation on the forward transmission bandwidth parameter of the OSU.

Before the intermediate node exits the adjustment mode corresponding to the OSU, the method further includes the following step. The intermediate node is configured to perform a second adjustment rollback operation on the forward transmission bandwidth parameter of the OSU.

Before the sink node exits the adjustment mode corresponding to the OSU, the method further includes the following step. The sink node is configured to perform a third adjustment rollback operation on the forward transmission bandwidth parameter of the OSU.

In some embodiments, a first adjustment rollback operation is performed on the forward transmission bandwidth parameter of the OSU. This process includes at least one of the following steps.

The source node is configured to restore the number of payload blocks corresponding to the OSU in a single forward transmission cycle.

The source node is configured to restore the forward transmission bandwidth of the OSU.

In some embodiments, a second adjustment rollback operation is performed on the forward transmission bandwidth parameter of the OSU. This process includes the following step.

The intermediate node is configured to restore the number of payload blocks corresponding to the OSU in a single forward transmission cycle.

In some embodiments, a third adjustment rollback operation is performed on the forward transmission bandwidth parameter of the OSU. This process includes the following step.

The sink node is configured to restore the bandwidth limitation of the forward sending interface.

Figure 3:
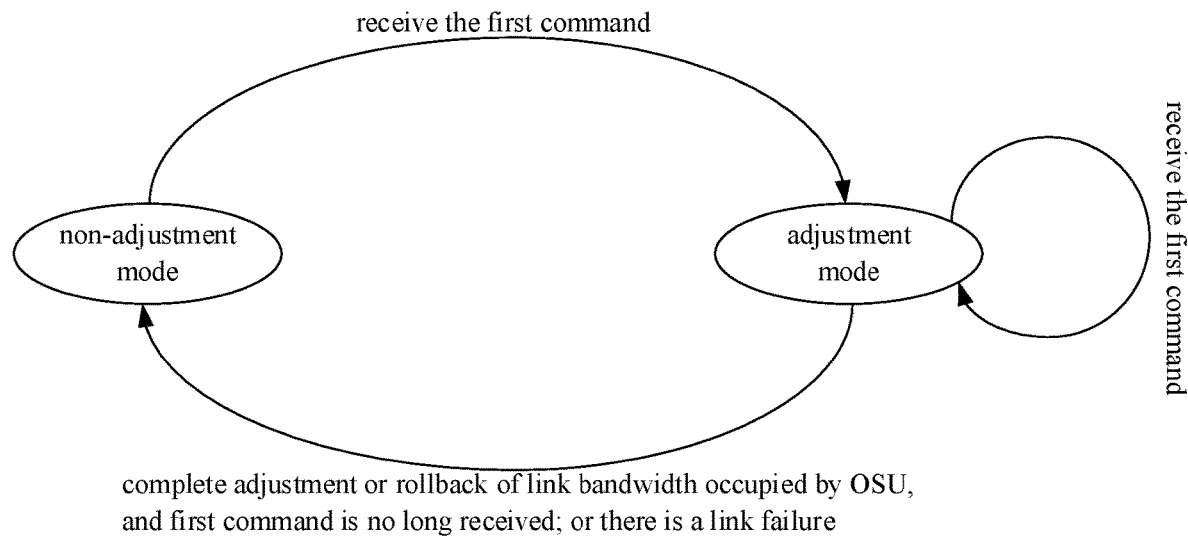
FIG. 3 is a schematic diagram showing a conversion between an adjustment mode and a non-adjustment mode in an embodiment of the present disclosure.

In some embodiments, after the source node receives the adjustment command sent by the network management server, the method further includes the following step. The source node is configured to determine whether it enters the adjustment mode; if not, enter the adjustment mode; otherwise, maintain the adjustment mode, as shown in FIG. 3.

After the intermediate node receives the first message sent by the upstream node of the intermediate node, the method further includes the following step. The intermediate node is configured to determine whether it enters the adjustment mode; if not, enter the adjustment mode; otherwise, maintain the adjustment mode.

After the sink node receives the first message sent by the upstream node of the sink node, the method further includes the following step. The sink node is configured to determine whether it enters the adjustment mode; if not, enter the adjustment mode; otherwise, maintain the adjustment mode.

In some embodiments, if the first adjustment or the fifth adjustment is successful, the method further includes the following step.

The source node is configured to report an adjustment result to the network management server, where the adjustment result is used to indicate that the bandwidth adjustment is successful.

If the second adjustment or the fourth adjustment is successful, the method further includes the following step.

The intermediate node is configured to report an adjustment result to the network management server, where the adjustment result is used to indicate that the bandwidth adjustment is successful.

If the third adjustment is successful, the method further includes the following step.

The sink node is configured to report an adjustment result to the network management server, where the adjustment result is used to indicate that the bandwidth adjustment is successful.

In some embodiments, the adjustment result includes at least one of: the adjusted forward transmission bandwidth parameter of the OSU, or a change of the forward transmission bandwidth parameter of the OSU.

In some embodiments, the change of the forward transmission bandwidth parameter of the OSU may refer to the change amount of the forward transmission bandwidth parameter of the OSU.

In some embodiments, after the sink node receives the first message, the method further includes the following step.

The sink node is configured to send a sixth message to the upstream node of the sink node, where the sixth message is used to trigger an adjustment of a reverse transmission parameter of the OSU.

It should be noted that the sixth message and the first message have the identical content but are transmitted in opposite directions, and a reverse adjustment process can be started actively without waiting for the network management server to issue the adjustment command.

In some embodiments, after the sink node sends a sixth message to the upstream node of the sink node, the method further includes the following steps.

The sink node is configured to perform a sixth adjustment on a reverse transmission bandwidth parameter of the OSU, and send the sixth message to the upstream node of the sink node if the sixth adjustment is successful.

The intermediate node is configured to receive the sixth message, perform a seventh adjustment on the reverse transmission bandwidth parameter of the OSU, and send the sixth message to the upstream node of the intermediate node if the seventh adjustment is successful.

The source node is configured to receive the sixth message, perform an eighth adjustment on the reverse transmission bandwidth parameter of the OSU, and return a seventh message to the downstream node of the source node if the eighth adjustment is successful.

The intermediate node is configured to receive the seventh message, and return the seventh message to the downstream node of the intermediate node.

The sink node is configured to receive the seventh message, and exit the adjustment mode corresponding to the OSU.

The intermediate node is configured to exit the adjustment mode corresponding to the OSU.

The source node is configured to exit the adjustment mode corresponding to the OSU.

In some embodiments, the sink node is configured to perform a sixth adjustment on a reverse transmission bandwidth parameter of the OSU. This process includes at least one of the following steps.

The sink node is configured to detect whether reverse link bandwidth resources are sufficient.

The sink node is configured to determine whether it is in a reverse adjustment enabling state.

The sink node is configured to adjust the number of payload blocks corresponding to the OSU in a single reverse transmission cycle.

The sink node is configured to reserve the adjusted number of the payload blocks.

The sink node is configured to adjust a reverse transmission bandwidth of the OSU.

In some embodiments, the intermediate node is configured to perform a seventh adjustment on the reverse transmission bandwidth parameter of the OSU. This process includes at least one of the following steps.

The intermediate node is configured to check a parameter of the sixth message.

The intermediate node is configured to detect whether reverse link bandwidth resources are sufficient.

The intermediate node is configured to determine whether it is in a reverse adjustment enabling state.

The intermediate node is configured to adjust the number of payload blocks corresponding to the OSU in a single reverse transmission cycle.

The intermediate node is configured to reserve the adjusted number of the payload blocks.

In some embodiments, the source node is configured to perform an eighth adjustment on the reverse transmission bandwidth parameter of the OSU. This process includes at least one of the following steps.

The source node is configured to check a parameter of the sixth message.

The source node is configured to determine whether it is in a reverse adjustment enabling state.

The source node is configured to adjust a bandwidth limitation of a reverse sending interface.

In some embodiments, after the intermediate node receives the seventh message and before the intermediate node returns the seventh message to the downstream node of the intermediate node, the method further includes the following step.

The intermediate node is configured to perform a ninth adjustment on the reverse transmission bandwidth parameter of the OSU, and continue to perform the step of returning the seventh message to the downstream node of the intermediate node if the ninth adjustment is successful.

After the sink node receives the seventh message and before the sink node exits the adjustment mode corresponding to the OSU, the method further includes the following step.

The sink node is configured to perform a tenth adjustment on the reverse transmission bandwidth parameter of the OSU, and continue to perform the step of exiting the adjustment mode corresponding to the OSU if the tenth adjustment is successful.

In some embodiments, the intermediate node is configured to perform a ninth adjustment on the reverse transmission bandwidth parameter of the OSU. This process includes at least one of the following steps.

The intermediate node is configured to check a parameter of the seventh message.

The intermediate node is configured to detect whether reverse link bandwidth resources are sufficient.

The intermediate node is configured to determine whether it is in a reverse bandwidth adjustment enabling state.

The intermediate node is configured to adjust the number of payload blocks corresponding to the OSU in a single reverse transmission cycle.

In some embodiments, the sink node is configured to perform a tenth adjustment on the reverse transmission bandwidth parameter of the OSU. This process includes at least one of the following steps.

The sink node is configured to check a parameter of the seventh message.

The sink node is configured to detect whether reverse link bandwidth resources are sufficient.

The sink node is configured to determine whether it is in a forward transmission bandwidth adjustment enabling state.

The sink node is configured to adjust the number of payload blocks corresponding to the OSU in a single reverse transmission cycle.

The sink node is configured to adjust a reverse transmission bandwidth of the OSU.

In some embodiments, sending the sixth message to the upstream node of the sink node includes the following step. The sixth message is periodically sent to the upstream node of the sink node.

Returning the seventh message to the downstream node of the source node includes the following step. The seventh message is periodically returned to the downstream node of the source node.

After the sink node exits the adjustment mode, the method further includes the following step. The sink node is configured to stop sending the sixth message.

After the source node returns the seventh message to the downstream node of the source node, the method further includes the following step. If the source node does not receive the sixth message within a preset time, the source node is configured to stop returning the seventh message to the downstream node of the source node, and exit the adjustment mode.

After the intermediate node returns the seventh message to the downstream node of the intermediate node, the method further includes the following step. If the intermediate node does not receive the seventh message within a preset time, the intermediate node is configured to exit the adjustment mode.

In some embodiments, if the sixth adjustment or the tenth adjustment fails, the method further includes the following step.

The sink node is configured to report an adjustment result to the network management server, and exit the adjustment mode corresponding to the OSU, where the adjustment result is used to indicate that the adjustment fails.

In some embodiments, if the seventh adjustment or the ninth adjustment fails, the method further includes the following steps.

The intermediate node is configured to report an adjustment result to the network management server, where the adjustment result is used to indicate that the adjustment fails.

The intermediate node is configured to send an eighth message to the sink node, where the eighth message is used to indicate that a bandwidth adjustment error occurs.

The sink node is configured to receive the eighth message, perform a fourth adjustment rollback operation on the reverse transmission bandwidth parameter of the OSU, and send a ninth message to the upstream node of the sink node.

The intermediate node is configured to receive the ninth message, and send the ninth message to the upstream node of the intermediate node.

The source node is configured to receive the ninth message, and return a tenth message to the downstream node of the source node.

The intermediate node is configured to receive the tenth message, and return the tenth message to the downstream node of the intermediate node.

The sink node is configured to receive the tenth message, and exit the adjustment mode corresponding to the OSU.

The intermediate node is configured to exit the adjustment mode corresponding to the OSU.

The sink node is configured to exit the adjustment mode corresponding to the OSU.

In some embodiments, if the eighth adjustment fails, the method further includes the following steps.

The source node is configured to report an adjustment result to the network management server, where the adjustment result is used to indicate that the adjustment fails.

The source node is configured to send an eighth message to the sink node, where the eighth message is used to indicate that an adjustment error occurs.

The sink node is configured to receive the eighth message, perform a fourth adjustment rollback operation on the reverse transmission bandwidth parameter of the OSU, and send a ninth message to the upstream node of the sink node.

The intermediate node is configured to receive the ninth message, perform a fifth adjustment rollback operation on the reverse transmission bandwidth parameter of the OSU, and send the ninth message to the upstream node of the intermediate node.

The source node is configured to receive the ninth message, and return a tenth message to the downstream node of the source node.

The intermediate node is configured to receive the tenth message, and return the tenth message to the downstream node of the intermediate node.

The sink node is configured to receive the tenth message, and exit the adjustment mode corresponding to the OSU.

The intermediate node is configured to exit the adjustment mode corresponding to the OSU.

The sink node is configured to exit the adjustment mode corresponding to the OSU.

In some embodiment, the eighth message includes at least one of the following items.

A state indicates that the adjustment fails.

A type indicates that the adjustment fails.

Node information indicates that the adjustment fails.

In some embodiments, the method further includes the following steps.

The sink node is configured to determine that there is a link failure prior to exiting the adjustment mode, perform a fourth adjustment rollback operation on the reverse transmission bandwidth parameter of the OSU, and exit the adjustment mode corresponding to the OSU.

The intermediate node is configured to determine that there is a link failure prior to exiting the adjustment mode, perform a fifth adjustment rollback operation on the reverse transmission bandwidth parameter of the OSU, and exit the adjustment mode corresponding to the OSU.

The source node is configured to determine that there is a link failure prior to exiting the adjustment mode, perform a sixth adjustment rollback operation on the reverse transmission bandwidth parameter of the OSU, and exit the adjustment mode corresponding to the OSU.

In some embodiments, a fourth adjustment rollback operation is performed on the reverse transmission bandwidth parameter of the OSU. This process includes at least one of the following steps.

The sink node is configured to restore the number of payload blocks corresponding to the OSU in a single reverse transmission cycle.

The sink node is configured to restore the reverse transmission bandwidth of the OSU.

In some embodiments, a fifth adjustment rollback operation is performed on the reverse transmission bandwidth parameter of the OSU. This process includes the following step.

The intermediate node is configured to restore the number of payload blocks corresponding to the OSU in a single reverse transmission cycle.

In some embodiments, a sixth adjustment rollback operation is performed on the reverse transmission bandwidth parameter of the OSU. This process includes the following step. The source node is configured to restore the bandwidth limitation of the reverse sending interface.

It should be noted that the adjustment of the reverse transmission bandwidth parameter is similar to that of the forward transmission parameter, and will not be repeated here.

Figure 4:
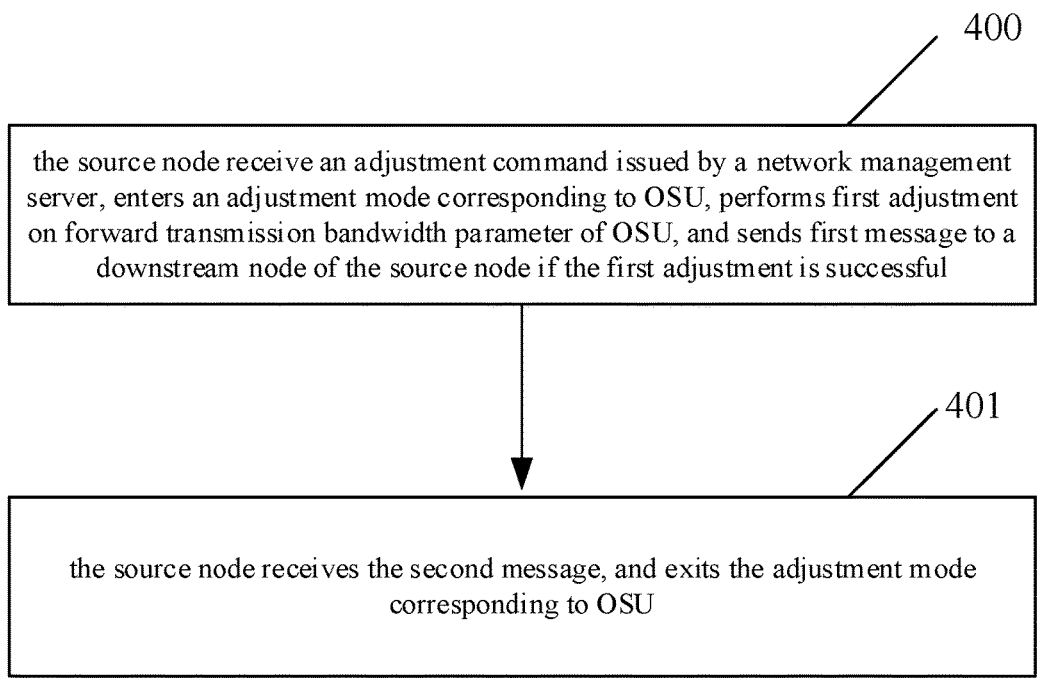
FIG. 4 is a flowchart of a bandwidth adjustment method applied to a source node side provided by another embodiment of the present disclosure.

FIG. 4 is a flowchart of a bandwidth adjustment method at a source node side provided by another embodiment of the present disclosure.

In a second aspect of present disclosure, referring to FIG. 4, another embodiment of the present disclosure provides a bandwidth adjustment method, which is applied to a source node, including following steps.

At S400, the source node is configured to receive an adjustment command issued by a network management server, enter an adjustment mode corresponding to an OSU, perform a first adjustment on a forward transmission bandwidth parameter of the OSU, and send a first message to a downstream node of the source node if the first adjustment is successful.

The specific implementation process of S400 is the same as that of S200 in the above embodiment, and will not be repeated here.

At S401, the source node is configured to receive a second message, and exit the adjustment mode corresponding to the OSU.

The specific implementation process of S401 is the same as that of S204 in the above embodiment, and will not be repeated here.

The specific implementation process of the bandwidth adjustment method applied to the source node side is the same as that of the source node in the bandwidth adjustment method of the previous embodiment, and will not be repeated here.

Figure 5:
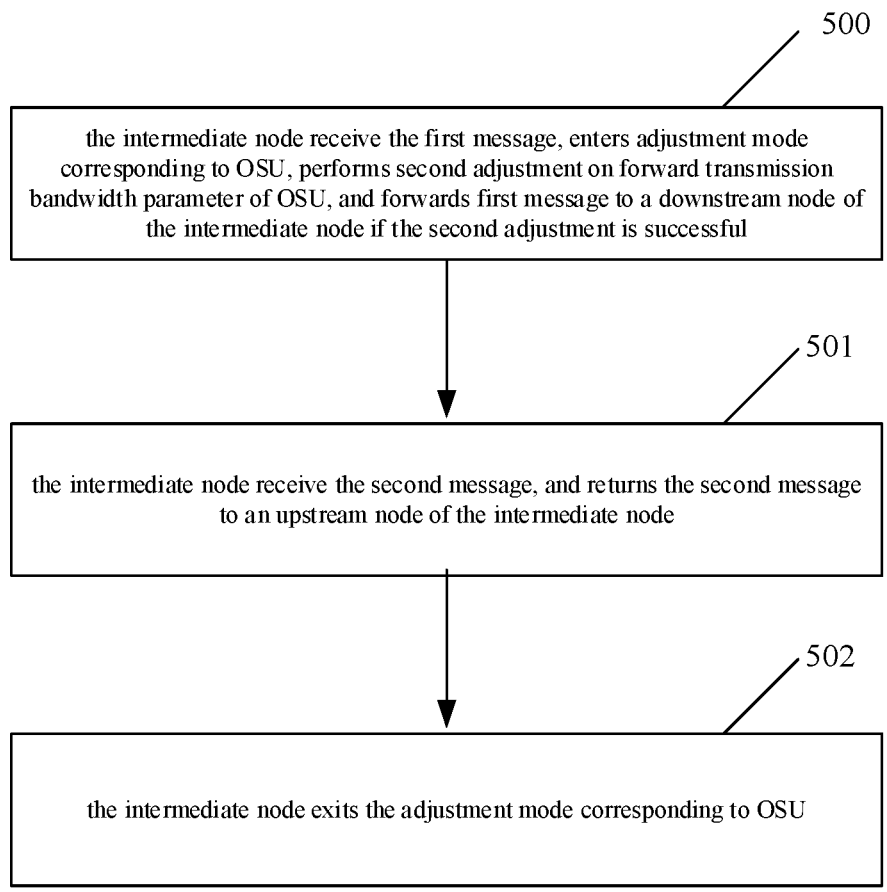
FIG. 5 is a flowchart of a bandwidth adjustment method applied to an intermediate node side provided by another embodiment of the present disclosure.

FIG. 5 is a flowchart of a bandwidth adjustment method applied to an intermediate node side provided by another embodiment of the present disclosure.

In a third aspect of the present disclosure, referring to FIG. 5, another embodiment of the present disclosure provides a bandwidth adjustment method, which is applied to an intermediate node, including following steps.

At S500, the intermediate node is configured to receive a first message, enter an adjustment mode corresponding to an OSU, perform a second adjustment on a forward transmission bandwidth parameter of the OSU, and forward the first message to a downstream node of the intermediate node if the second adjustment is successful.

The specific implementation process of S500 is the same as that of S201 in the previous embodiment, and will not be repeated here.

At S501, the intermediate node is configured to receive a second message, and return the second message to an upstream node of the intermediate node.

The specific implementation process of S501 is the same as that of S203 in the previous embodiment, and will not be repeated here.

At S502, the intermediate node is configured to exit the adjustment mode corresponding to the OSU.

The specific implementation process of S502 is the same as that of S205 in the above embodiment, and will not be repeated here.

The specific implementation process of the bandwidth adjustment method applied to the intermediate node side is the same as that of the intermediate node in the bandwidth adjustment method of the above embodiment, and will not be repeated here.

Figure 6:
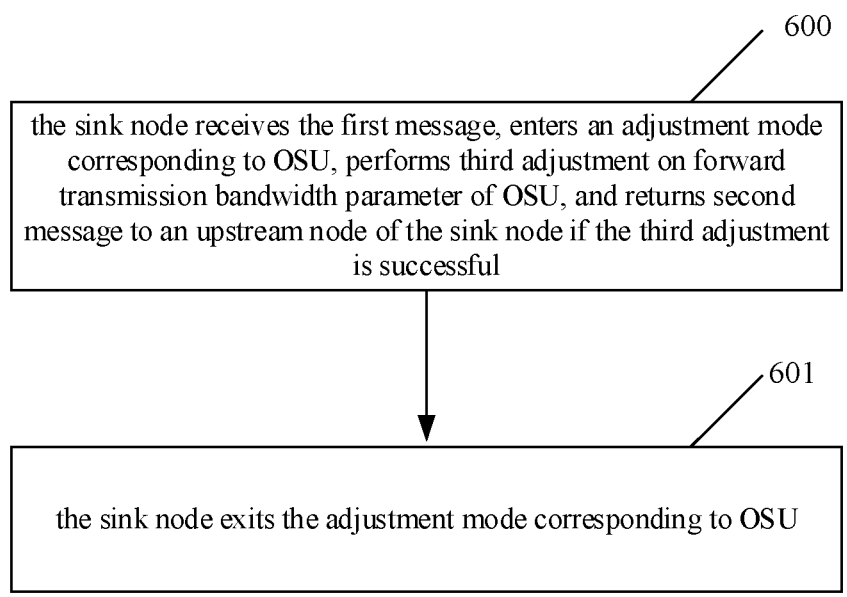
FIG. 6 is a flowchart of a bandwidth adjustment method applied to a sink node side provided by another embodiment of the present disclosure.

FIG. 6 is a flowchart of a bandwidth adjustment method applied to a sink node side provided by another embodiment of the present disclosure.

In a fourth aspect of the present disclosure, referring to FIG. 6, another embodiment of the present disclosure provides a bandwidth adjustment method, which is applied to a sink node, including following steps.

At S600, the sink node is configured to receive a first message, enter an adjustment mode corresponding to an OSU, perform a third adjustment on a forward transmission bandwidth parameter of the OSU, and return a second message to an upstream node of the sink node if the third adjustment is successful.

The specific implementation process of S600 is the same as that of S202 in the above embodiment, and will not be repeated here.

At S601, the sink node is configured to exit the adjustment mode corresponding to the OSU.

The specific implementation process of S601 is the same as that of S206 in the above embodiment, and will not be repeated here.

The specific implementation process of the bandwidth adjustment method applied to the sink node side is the same as that of the sink node in the bandwidth adjustment method of the above embodiment, and will not be repeated here.

The specific implementation process of the embodiments of the present disclosure will be explained in detail below through the following examples. The listed examples are only intended for convenience of explanation, and are not intended to limit the protection scope of the embodiments of the present disclosure.

To simplify the description, in the following examples, it is considered that there is only one intermediate node between the source node and the sink node, that is, the path only includes the source node, one intermediate node and the sink node.

Example One

Figure 7:
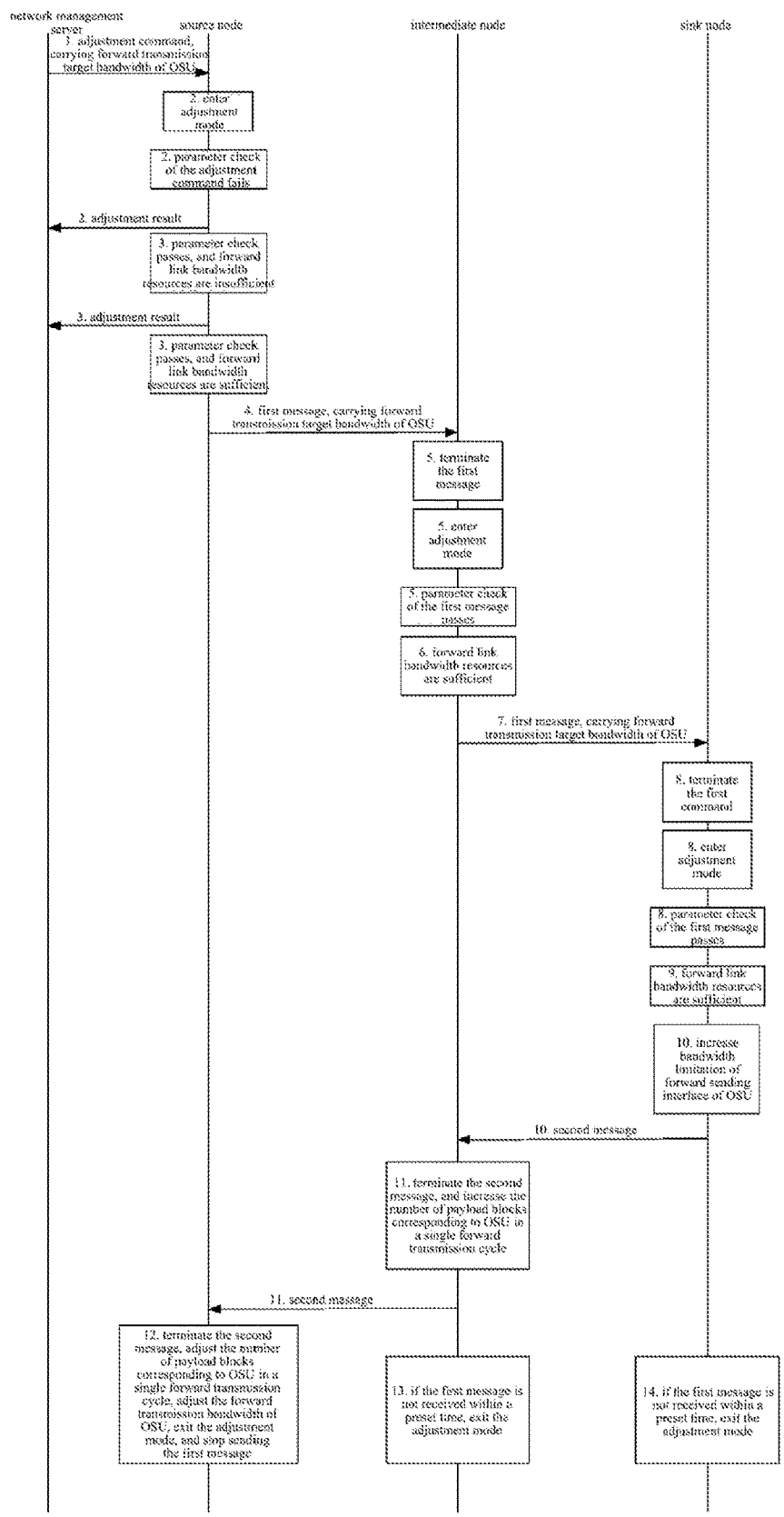
FIG. 7 is a schematic diagram showing interaction of a bandwidth adjustment method in Example one of an embodiment of the present disclosure.

This example describes the process of increasing the forward transmission bandwidth parameter of the OSU. As shown in FIG. 7, the method includes following operations.

1. A network management server is configured to send an adjustment command to a source node, where the adjustment command is used to request to increase a forward transmission bandwidth parameter of an OSU, and the adjustment command includes a forward transmission target bandwidth of the OSU.

2. The source node is configured to receive the adjustment command sent by the network management server, enter an adjustment mode, and check a parameter of the adjustment command. If the check passes, the process proceeds to an operation 3, and if the check fails, the source node is configured to report an adjustment result to the network management server, where the adjustment result is used to indicate that the bandwidth adjustment fails, and the adjustment result includes a failure reason of a parameter error of the adjustment command.

In this operation, the parameter of the adjustment command is checked, that is, it is judged whether the forward transmission target bandwidth of the OSU is within a reasonable range, if so, the check passes; otherwise, the check fails.

3. The source node is configured to determine whether forward link bandwidth resources are sufficient, if so, an operation 4 is performed; otherwise, the source node is configured to report an adjustment result to the network management server, where the adjustment result is used to indicate that the bandwidth adjustment fails, and the adjustment result includes a failure reason of insufficient forward link bandwidth resources.

4. The source node is configured to periodically send a first message to an intermediate node by means of in-band channel associated overhead, where the first message includes the forward transmission target bandwidth of the OSU.

5. The intermediate node is configured to receive the first message sent by the source node for the first time, terminate the first message, enter an adjustment mode, and check a parameter of the first message, if the check passes, the process proceeds to an operation 6.

In this operation, the parameter of the first message is checked, that is, it is determined whether the forward transmission target bandwidth of the OSU is within a reasonable range, if so, the check passes; otherwise, the check fails.

6. The intermediate node is configured to determine whether the forward link bandwidth resources are sufficient, if so, an operation 7 is performed.

7. The intermediate node is configured to send the first message to a sink node by means of in-band channel associated overhead.

8. The sink node is configured to receive the first message sent by the intermediate node, terminate the first message, enter an adjustment mode, and check the parameter of the first message, if the check passes, the process proceeds to an operation 9.

In this operation, the parameter of the first message is checked, that is, it is determined whether the forward transmission target bandwidth of the OSU is within a reasonable range, if so, the check passes; otherwise, the check fails.

9. The sink node is configured to determine whether the forward link bandwidth resources are sufficient, if so, an operation 10 is performed.

10. The sink node is configured to increase a bandwidth limitation of a forward sending interface of the OSU, and periodically return a second message to the intermediate node by means of in-band channel associated overhead, where the second message is used to acknowledge to increase the forward transmission bandwidth parameter of the OSU.

11. The intermediate node is configured to receive the second message returned by the sink node for the first time, terminate the second message, increase the number of payload blocks corresponding to the OSU in a single forward transmission cycle, and return the second message to the source node by means of in-band channel associated overhead.

12. The source node is configured to receive the second message returned by the intermediate node for the first time, terminate the second message, adjust the number of payload blocks corresponding to the OSU in a single forward transmission cycle, adjust the forward transmission bandwidth of the OSU, exit the adjustment mode, and stop sending the first message.

13. After returning the second message to the source node by means of in-band channel associated overhead, if not receiving the first message and the second message within a preset time, the intermediate node is configured to exit the adjustment mode.

14. After increasing the bandwidth limitation of the forward sending interface of the OSU, if not receiving the first message within a preset time, the sink node is configured to exit the adjustment mode.

Example Two

Figure 8:
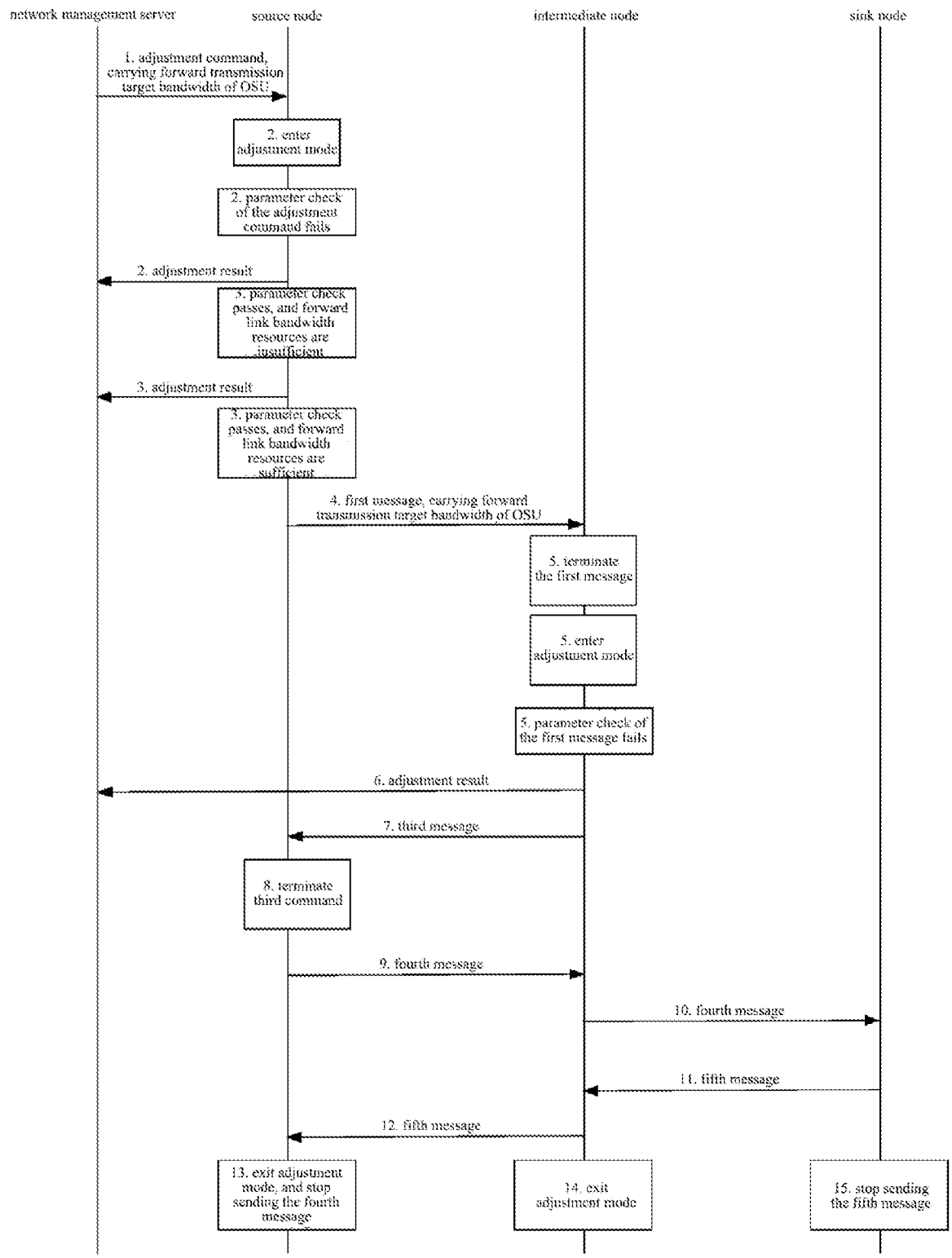
FIG. 8 is a schematic diagram showing interaction of a bandwidth adjustment method in Example two of an embodiment of the present disclosure.

This example describes a process in which the intermediate node does not pass the checking of the parameter of the first message in the process of increasing the forward transmission bandwidth parameter of the OSU. As shown in FIG. 8, the method includes following operations.

1. A network management server is configured to send an adjustment command to a source node, where the adjustment command is used to request to increase a forward transmission bandwidth parameter of an OSU, and the adjustment command includes a forward transmission target bandwidth of the OSU.

2. The source node is configured to receive the adjustment command sent by the network management server, enter an adjustment mode, and check a parameter of the adjustment command. If the checks passes, the process proceeds to an operation 3; and if the check fails, the source node is configured to report an adjustment result to the network management server, where the adjustment result is used to indicate that the bandwidth adjustment fails, and the adjustment result includes a failure reason of a parameter error of the adjustment command.

In this operation, the parameter of the adjustment command is checked, that is, it is determined whether the forward transmission target bandwidth of the OSU is within a reasonable range, if so, the check passes; otherwise, the check fails.

3. The source node is configured to determine whether forward link bandwidth resources are sufficient, if so, an operation 4 is performed; otherwise, the source node is configured to report an adjustment result to the network management server, where the adjustment result is used to indicate that the bandwidth adjustment fails, and the adjustment result includes a failure reason of insufficient forward link bandwidth resources.

4. The source node is configured to periodically send a first message to an intermediate node by means of in-band channel associated overhead, where the first message includes the forward transmission target bandwidth of the OSU.

5. The intermediate node is configured to receive the first message sent by the source node for the first time, terminates the first message, enter an adjustment mode, and check the parameter of the first message, if the check fails, the process proceeds to an operation 6.

6. The intermediate node is configured to report an adjustment result to the network management server, where the adjustment result is used to indicate that the bandwidth adjustment fails, and the adjustment result includes a failure reason of a parameter error of the first message.

7. The intermediate node is configured to send a third message to the source node by means of in-band channel associated overhead, where the third message is used to indicate that an adjustment error occurs.

8. The source node is configured to receive the third message, and terminate the third message.

9. The source node is configured to periodically send a fourth message to the intermediate node by means of in-band channel associated overhead, where the fourth message is used to indicate to perform an adjustment rollback operation.

10. The intermediate node is configured to receive the fourth message, and send the fourth message to the sink node by means of in-band channel associated overhead.

11. The sink node is configured to receive the fourth message, and periodically return a fifth message to the intermediate node by means of in-band channel associated overhead, where the fifth message is used to acknowledge to perform an adjustment rollback operation.

12. The intermediate node is configured to receive the fifth message, and return the fifth message to the source node by means of in-band channel associated overhead.

13. The source node is configured to receive the fifth message, exit the adjustment mode, and stop sending the fourth message.

14. If not receiving the fourth message or the fifth message within a preset time, the intermediate node is configured to exit the adjustment mode.

15. If not receiving the fourth message within a preset time, the sink node is configured to stop returning the fifth message.

Example Three

Figure 9:
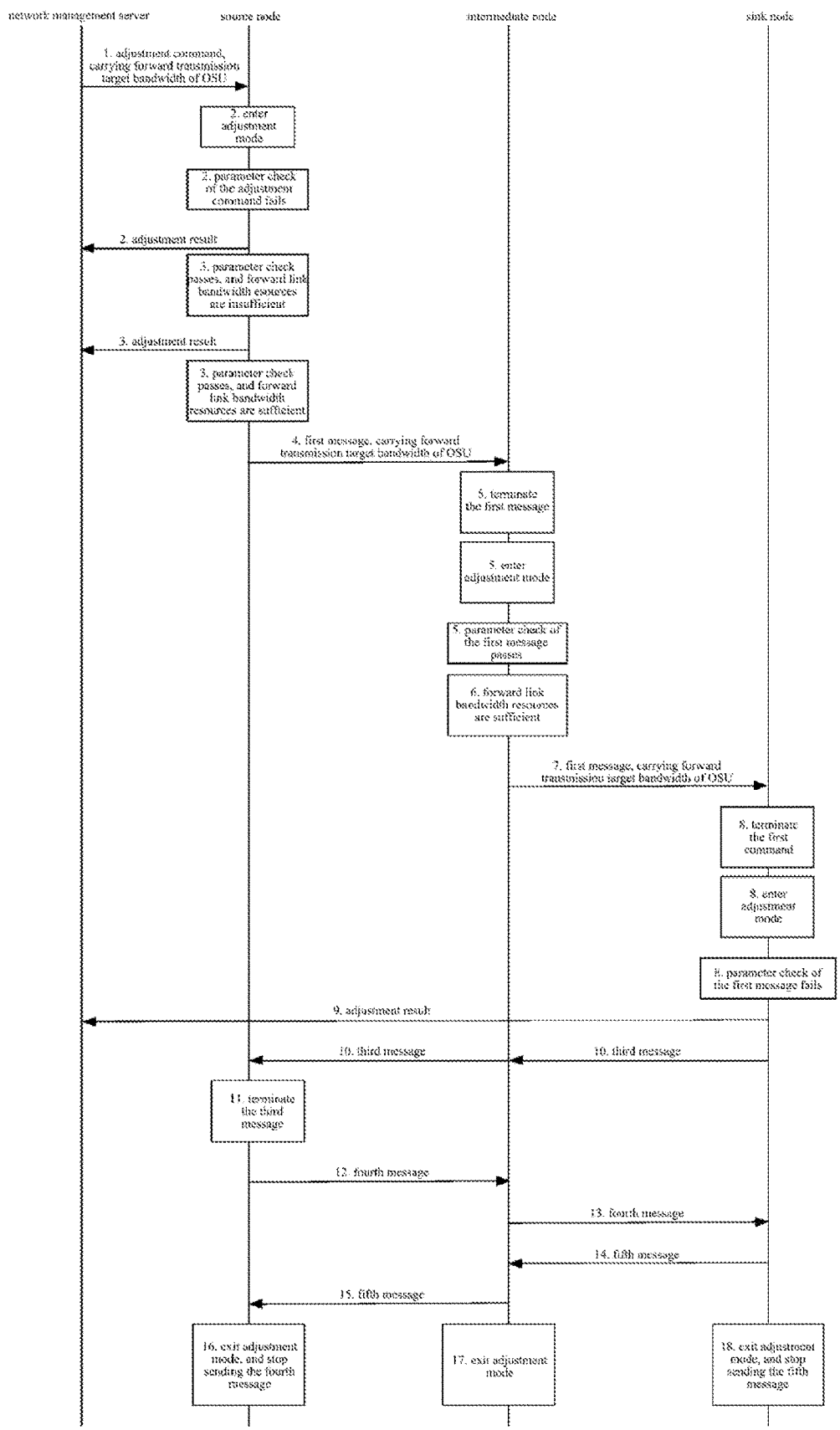
FIG. 9 is a schematic diagram showing interaction of a bandwidth adjustment method in Example three of an embodiment of the present disclosure.

This example describes the process in which the sink node does not pass the checking of the parameter of the first message in the process of increasing the forward transmission bandwidth parameter of the OSU. As shown in FIG. 9, the method includes following operations.

1. A network management server is configured to send an adjustment command to a source node, where the adjustment command is used to request to increase a forward transmission bandwidth parameter of an OSU, and the adjustment command includes a forward transmission target bandwidth of the OSU.

2. The source node is configured to receive the adjustment command sent by the network management server, enter an adjustment mode, and check a parameter of the adjustment command. If the check passes, the process proceeds to an operation 3; and if the check fails, the source node is configured to report an adjustment result to the network management server, where the adjustment result is used to indicate that the bandwidth adjustment fails, and the adjustment result includes a failure reason of a parameter error of the adjustment command.

In this operation, the parameter of the adjustment command is checked, that is, it is determined whether the forward transmission target bandwidth of the OSU is within a reasonable range, if so, the check passes; otherwise, the check fails.

3. The source node is configured to determine whether forward link bandwidth resources are sufficient, if so, an operation 4 is performed; otherwise, the source node is configured to report an adjustment result to the network management server, where the adjustment result is used to indicate that the bandwidth adjustment fails, and the adjustment result includes a failure reason of insufficient forward link bandwidth resources.

4. The source node is configured to periodically send a first message to the intermediate node by means of in-band channel associated overhead, where the first message includes the forward transmission target bandwidth of the OSU.

5. The intermediate node is configured to receive the first message sent by the source node for the first time, terminate the first message, enter an adjustment mode, and check a parameter of the first message, if the check passes, the process proceeds to an operation 6.

In this operation, the parameter of the first message is checked, that is, it is determined whether the forward transmission target bandwidth of the OSU is within a reasonable range, if so, the check passes; otherwise, the check fails.

6. The intermediate node is configured to determine whether forward link bandwidth resources are sufficient, if so, an operation 7 is performed.

7. The intermediate node is configured to send the first message to a sink node by means of in-band channel associated overhead.

8. The sink node is configured to receive the first message sent by the intermediate node, terminate the first message, enter an adjustment mode, and check the parameter of the first message, if the check fails, the process proceeds to an operation 9.

In this operation, the parameter the first message is checked, that is, it is determined whether the forward transmission target bandwidth of the OSU is within a reasonable range, if so, the check passes; otherwise, the check fails.

9. The sink node is configured to report an adjustment result to the network management server, where the adjustment result is used to indicate that the bandwidth adjustment fails, and the adjustment result includes a failure reason of a parameter error of the first message.

10. The sink node is configured to send a third message to the source node by means of in-band channel associated overhead, and the third message is used to indicate that a bandwidth adjustment error occurs.

11. The source node is configured to receive the third message and terminate the third message.

12. The source node is configured to periodically send a fourth message to the intermediate node by means of in-band channel associated overhead, where the fourth message is used to indicate to perform an adjustment rollback operation.

13. The intermediate node is configured to receive the fourth message, and send the fourth message to the sink node by means of in-band channel associated overhead.

14. The sink node is configured to receive the fourth message, periodically return a fifth message to the intermediate node by means of in-band channel associated overhead, where the fifth message is used to acknowledge to perform the adjustment rollback operation.

15. The intermediate node is configured to receive the fifth message, and return the fifth message to the source node by means of in-band channel associated overhead.

16. The source node is configured to receive the fifth message, exit the adjustment mode, and stop sending the fourth message.

17. If not receiving the fourth message or the fifth message within a preset time, the intermediate node is configured to exit the adjustment mode.

18. If not receiving the fourth message within a preset time, the sink node is configured to exit the adjustment mode, and stop returning the fifth message.

Example Four

Figure 10:
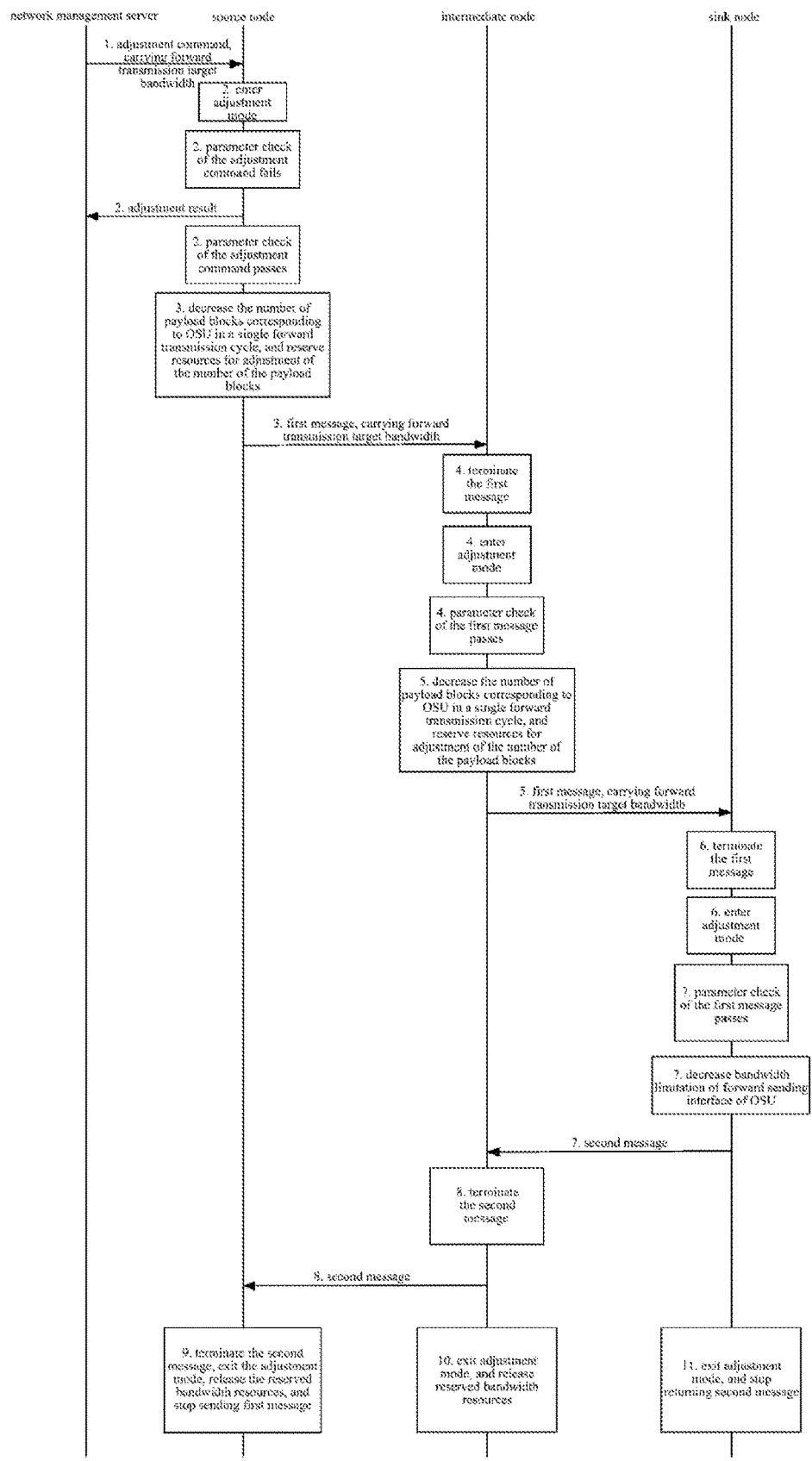
FIG. 10 is a schematic diagram showing interaction of a bandwidth adjustment method in Example four of an embodiment of the present disclosure.

This example describes the process of decreasing the forward transmission bandwidth parameter of the OSU. As shown in FIG. 10, the method includes operations.

1. A network management server is configured to send an adjustment command to a source node, where the adjustment command is used to request to decrease a forward transmission bandwidth parameter of an OSU, and the adjustment command includes a forward transmission target bandwidth of the OSU.

2. The source node is configured to receive the adjustment command sent by the network management server, enter an adjustment mode, and check a parameter of the adjustment command. If the check passes, the process proceeds to an operation 3; and if the check fails, the source node is configured to report an adjustment result to the network management server, where the adjustment result is used to indicate that the bandwidth adjustment fails, and the adjustment result includes a failure reason of a parameter error of the adjustment command.

3. The source node is configured to decrease the number of payload blocks corresponding to the OSU in a single forward transmission cycle, periodically send a first message to an intermediate node by means of in-band channel associated overhead, and reserve resources for the adjustment of the number of the payload blocks.

4. The intermediate node is configured to receive the first message sent by the source node for the first time, terminate the first message, enter an adjustment mode, and check a parameter of the first message, if the check is passes, the process proceeds to an operation 5.

5. The intermediate node is configured to decrease the number of payload blocks corresponding to the OSU in a single forward transmission cycle, send the first message to a sink node by means of in-band channel associated overhead, and reserve resources for the adjustment of the number of the payload blocks.

6. The sink node is configured to receive the first message sent by the intermediate node, terminate the first message, enter an adjustment mode, and check the parameter of the first message, if the check is passes, the process proceeds to an operation 9.

7. The sink node is configured to decrease a bandwidth limitation of a forward sending interface of the OSU, and periodically return a second message to the intermediate node by means of in-band channel associated overhead, where the second message is used to acknowledge to decrease of the forward transmission bandwidth parameter of the OSU.

8. The intermediate node is configured to receive the second message returned by the sink node, terminate the second message, and return the second message to the source node by means of in-band channel associated overhead.

9. The source node is configured to receive the second message, terminate the second message, exit the adjustment mode, release the reserved bandwidth resources, and stop sending the first message.

10. After returning the second message to the source node by means of in-band channel associated overhead, if not receiving the first message or the second message within a preset time, the intermediate node is configured to exit the adjustment mode, and release the reserved bandwidth resources.

11. After decreasing the bandwidth limitation of the forward sending interface of the OSU, if not receiving the first message within a preset time, the sink node is configured to exit the adjustment mode, and stop returning the second message.

Example Five

Figure 11:
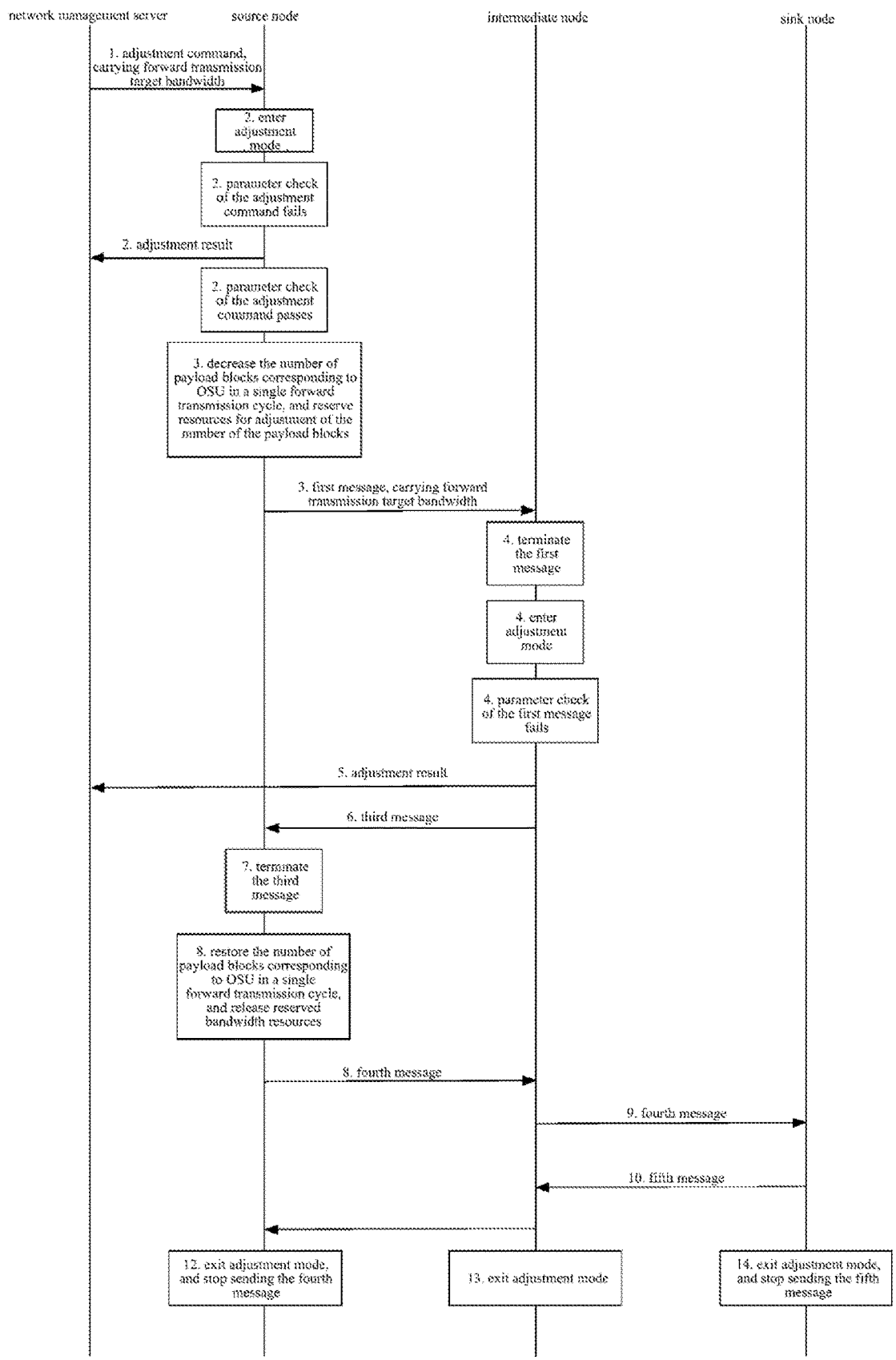
FIG. 11 is a schematic diagram showing interaction of a bandwidth adjustment method in Example five of an embodiment of the present disclosure.

This example describes the process in which the intermediate node does not pass the checking of the parameter of the first message in the process of decreasing the forward transmission bandwidth parameter of the OSU. As shown in FIG. 11, the method includes following operations.

1. A network management server is configured to send an adjustment command to a source node, where the adjustment command is used to request to decrease a forward transmission bandwidth parameter of an OSU, and the adjustment command includes a forward transmission target bandwidth of the OSU.

2. The source node is configured to receive the adjustment command sent by the network management server, enter an adjustment mode, and check a parameter of the adjustment command. If the check passes, the process proceeds to an operation 3; and if the check fails, the source node is configured to report an adjustment result to the network management server, where the adjustment result is used to indicate that the bandwidth adjustment fails, and the adjustment result includes a failure reason of a parameter error of the adjustment command.

3. The source node is configured to decrease the number of payload blocks corresponding to the OSU in a single forward transmission cycle, periodically send a first message to an intermediate node by means of in-band channel associated overhead, and reserve resources for the adjustment of the number of the payload blocks.

4. The intermediate node is configured to receive the first message sent by the source node for the first time, terminate the first message, enter an adjustment mode, and check a parameter of the first message, if the check fails, the process proceeds to an operation 5.

5. The intermediate node is configured to report an adjustment result to the network management server, where the adjustment result is used to indicate that the bandwidth adjustment fails, and the adjustment result includes a failure reason of a parameter error of the first message.

6. The intermediate node is configured to send a third message to the source node by means of in-band channel associated overhead, where the third message is used to indicate that a bandwidth adjustment error occurs.

7. The source node is configured to receive the third message, and terminate the third message.

8. The source node is configured to restore the number of payload blocks corresponding to the OSU in a single forward transmission cycle, release the reserved bandwidth resources, and periodically send a fourth message to the intermediate node by means of in-band channel associated overhead, where the fourth message is used to indicate to perform an adjustment rollback operation.

9. The intermediate node is configured to receive the fourth message for the first time, and send the fourth message to a sink node by means of in-band channel associated overhead.

10. The sink node is configured to receive the fourth message, and periodically return a fifth message to the intermediate node by means of in-band channel associated overhead, where the fifth message is used to acknowledge to perform the adjustment rollback operation.

11. The intermediate node is configured to receive the fifth message, and return the fifth message to the source node by means of in-band channel associated overhead.

12. The source node is configured to receive the fifth message, exit the adjustment mode, and stop sending the fourth message.

13. If not receiving the fourth message or the fifth message within a preset time, the intermediate node is configured to exit the adjustment mode.

14. If not receiving the fourth message within a preset time, the sink node is configured to stop sending the fifth message.

Example Six

Figure 12:
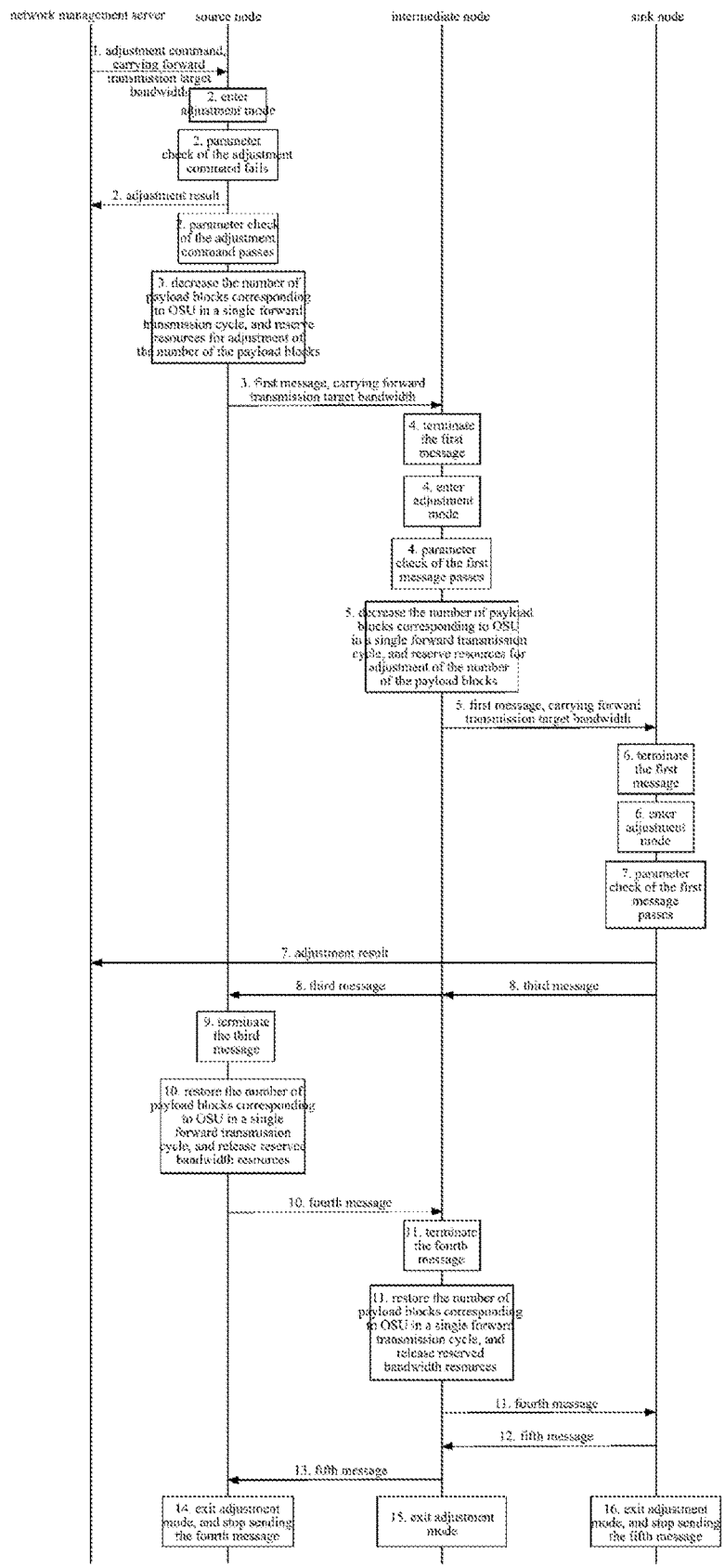
FIG. 12 is a schematic diagram showing interaction of a bandwidth adjustment method in Example six of an embodiment of the present disclosure.

This example describes the process in which the sink node does not pass the checking of the parameter of the first message in the process of decreasing the forward transmission bandwidth parameter of the OSU. As shown in FIG. 12, the method includes following operations.

1. A network management server is configured to send an adjustment command to a source node, where the adjustment command is used to request to decrease a forward transmission bandwidth parameter of an OSU, and the adjustment command includes a forward transmission target bandwidth of the OSU.

2. The source node is configured to receive the adjustment command sent by the network management server, enter an adjustment mode, and check a parameter of the adjustment command. If the check passes, the process proceeds to an operation 3; and if the check fails, the source node is configured to report an adjustment result to the network management server, where the adjustment result is used to indicate that the bandwidth adjustment fails, and the adjustment result includes a failure reason of a parameter error of the adjustment command.

3. The source node is configured to decrease the number of payload blocks corresponding to the OSU in a single forward transmission cycle, periodically send a first message to an intermediate node by means of in-band channel associated overhead, and reserve resources for the adjustment of the number of the payload blocks.

4. The intermediate node is configured to receive the first message sent by the source node for the first time, terminate the first message, enter an adjustment mode, and check a parameter of the first message, if the check passes, the process proceeds to an operation 5.

5. The intermediate node is configured to decrease the number of payload blocks corresponding to the OSU in a single forward transmission cycle, send the first message to a sink node by means of in-band channel associated overhead, and reserve resources for the adjustment of the number of payload blocks.

6. The sink node is configured to receive the first message sent by the intermediate node, terminate the first message, enter an adjustment mode, and check the parameter of the first message, if the check fails, the process proceeds to an operation 9.

7. The sink node is configured to report an adjustment result to the network management server, where the adjustment result is used to indicate that the bandwidth adjustment fails, and the adjustment result includes a failure reason of a parameter error of the adjustment command.

8. The sink node is configured to send a third message to the source node by means of in-band channel associated overhead, where the third message is used to indicate that a bandwidth adjustment error occurs.

9. The source node is configured to receive the third message, and terminate the third message.

10. The source node is configured to restore the number of payload blocks corresponding to the OSU in a single forward transmission cycle, release the reserved bandwidth resources, and periodically send a fourth message to the intermediate node by means of in-band channel associated overhead, where the fourth message is used to perform an adjustment rollback operation.

11. The intermediate node is configured to receive the fourth message for the first time, terminate the fourth message, restore the number of payload blocks corresponding to the OSU in a single forward transmission cycle, release the reserved bandwidth resources, and send the fourth message to the sink node by means of in-band channel associated overhead.

12. The sink node is configured to receive the fourth message, and periodically return a fifth message to the intermediate node by means of in-band channel associated overhead, where the fifth message is used to acknowledge to perform the adjustment rollback operation.

13. The intermediate node is configured to receive the fifth message, and return the fifth message to the source node by means of in-band channel associated overhead.

14. The source node is configured to receive the fifth message, exit the adjustment mode, and stop sending the fourth message.

15. If not receiving the fourth message or the fifth message within a preset time, the intermediate node is configured to exit the adjustment mode.

16. If not receiving the fourth message within a preset time, the sink node is configured to exit the adjustment mode, and stops sending the fifth message.

In an eighth aspect of present disclosure, an embodiment of the present disclosure provides an electronic device, including:

at least one processor; and a memory, storing at least one program which, when executed by at least one processor, causes the at least one processor to implement any one of the above bandwidth adjustment methods.

The processor is a device with data processing capability, which includes, but not limited to, a Central Processing Unit (CPU), etc. The memory is a device with data storage capability, which includes, but not limited to, a Random Access Memory (RAM, more specifically SDRAM, DDR, and the like), a Read-Only Memory (ROM), an Electrically Erasable Programmable Read-Only Memory (EEPROM) and a FLASH memory (Flash).

In some embodiments, the processor and the memory are connected by a bus, and then connected with other components of the computing device.

In a ninth aspect of the present disclosure, an embodiment of the present disclosure provides a computer-readable storage medium, storing a computer program which, when executed by a processor, causes the processor to implement any one of the above-mentioned bandwidth adjustment methods.

Figure 13:
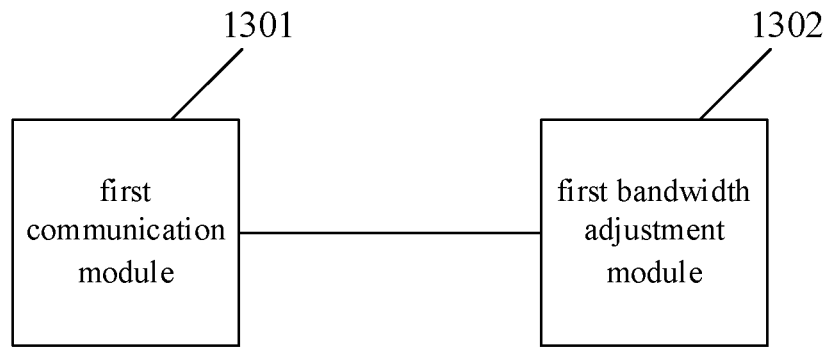
FIG. 13 is a block diagram showing composition of a source node provided by another embodiment of the present disclosure.

FIG. 13 is a block diagram showing composition of a source node provided in another embodiment of the present disclosure.

In a fifth aspect of the present disclosure, referring to FIG. 13, another embodiment of the present disclosure provides a source node. The source node includes the following modules.

A first communication module 1301 is configured to receive an adjustment command issued by a network management server; send a first message to a downstream node of a source node if a first adjustment is successful; and receive a second message.

A first bandwidth adjustment module 1302 is configured to enter an adjustment mode corresponding to an OSU when the first communication module 1301 receives the adjustment command issued by the network management server, and perform a first adjustment on a forward transmission bandwidth parameter of the OSU; and exit the adjustment mode corresponding to the OSU when the first communication module 1301 receives the second message.

In some embodiments, the first bandwidth adjustment module 1302 is configured to perform a first adjustment on the forward transmission bandwidth parameter of the OSU in at least one of the following ways:
checking a parameter of the adjustment command;
detecting whether forward link bandwidth resources are sufficient;
determining whether it is in a forward adjustment enabling state;
adjusting the number of payload blocks corresponding to the OSU in a single forward transmission cycle;
reserving the adjusted number of the payload blocks; or
adjusting a forward transmission bandwidth of the OSU.

In some embodiments, the first bandwidth adjustment module 1302 is further configured to:
perform a fifth adjustment on the forward transmission bandwidth parameter of the OSU, and continue to perform the step of exiting the adjustment mode corresponding to the OSU if the fifth adjustment is successful.

In some embodiments, the first bandwidth adjustment module 1302 is configured to perform a fifth adjustment on the forward transmission bandwidth parameter of the OSU in at least one of the following ways:
checking a parameter of the second message;
detecting whether forward link bandwidth resources are sufficient;
determining whether it is in a forward transmission bandwidth adjustment enabling state;
adjusting the number of payload blocks corresponding to the OSU in a single forward transmission cycle; or
adjusting a forward transmission bandwidth of the OSU.

In some embodiments, the first communication module 1301 is configured to send the first message to the downstream node of the source node in the following mode: periodically sending the first message to the downstream node of the source node.

The first communication module 1301 is further configured to stop sending the first message.

In some embodiments, the first communication module 1301 is further configured to:
if the first adjustment or the fifth adjustment fails, report an adjustment result to the network management server, and exit the adjustment mode corresponding to the OSU, where the adjustment result is used to indicate that the adjustment fails.

In some embodiments, the first communication module 1301 is further configured to receive a third message, and send a fourth message to the downstream node of the source node; and receive a fifth message.

The first bandwidth adjustment module 1302 is further configured to perform a first adjustment rollback operation on the forward transmission bandwidth parameter of the OSU; and exit the adjustment mode corresponding to the OSU.

In some embodiment, the third message includes at least one of the following items.
A state indicates that the adjustment fails.
A type indicates that the adjustment fails.
Node information indicates that the adjustment fails.

In some embodiments, the first bandwidth adjustment module 1302 is further configured to:
determine that there is a link failure after entering the adjustment mode and prior to exiting the adjustment mode, and exit the adjustment mode corresponding to the OSU.

In some embodiments, the first bandwidth adjustment module 1302 is further configured to: perform a first adjustment rollback operation on the forward transmission bandwidth parameter of the OSU.

In some embodiments, the first bandwidth adjustment module 1302 is configured to perform a first adjustment rollback operation on the forward transmission bandwidth parameter of the OSU in at least one of the following ways.

The source node is configured to restore the number of payload blocks corresponding to the OSU in a single forward transmission cycle.

The source node is configured to restore the forward transmission bandwidth of the OSU.

The specific implementation process of the source node is the same as that of the bandwidth adjustment method applied to the source node side in the above embodiment, and will not be repeated here.

Figure 14:
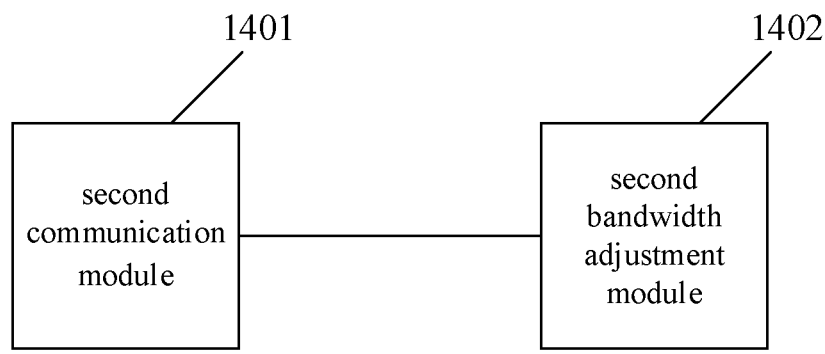
FIG. 14 is a block diagram showing composition of an intermediate node provided by another embodiment of the present disclosure.

FIG. 14 is a block diagram showing composition of an intermediate node provided in another embodiment of the present disclosure.

In a sixth aspect of the present disclosure, referring to FIG. 14, another embodiment of the present disclosure provides an intermediate node. The intermediate node includes the following modules.

A second communication module 1401 is configured to receive a first message and forward the first message to a downstream node of the intermediate node; and receive a second message and return the second message to an upstream node of the intermediate node.

A second bandwidth adjustment module 1402 is configured to enter an adjustment mode corresponding to an OSU and perform a second adjustment on the forward transmission bandwidth parameter of the OSU; and exit the adjustment mode corresponding to the OSU.

In some embodiments, the second bandwidth adjustment module 1402 is configured to perform a second adjustment on the forward transmission bandwidth parameter of the OSU in at least one of the following ways:
  checking a parameter of the first message;
  detecting whether forward link bandwidth resources are sufficient;
  determining whether it is in a forward adjustment enabling state;
  adjusting the number of payload blocks corresponding to the OSU in a single forward transmission cycle; or
  reserving the adjusted number of the payload blocks.

In some embodiments, the second bandwidth adjustment module 1402 is further configured to:
  perform a fourth adjustment on the forward transmission bandwidth parameter of the OSU.

In some embodiments, the second bandwidth adjustment module 1402 is configured to perform a fourth adjustment on the forward transmission bandwidth parameter of the OSU in at least one of the following ways:
  checking a parameter of the second message;
  detecting whether forward link bandwidth resources are sufficient;
  determining whether it is in a forward transmission bandwidth adjustment enabling state; or
  adjusting the number of payload blocks corresponding to the OSU in a single forward transmission cycle.

In some embodiments, the second bandwidth adjustment module 1402 is further configured to:
  exit the adjustment mode in the case where the second communication module 1401 does not receive the second message within a preset time.

In some embodiments, the second communication module 1401 is further configured to: report an adjustment result to the network management server if the second adjustment or the fourth adjustment fails, where the adjustment result is used to indicate that the adjustment fails; send a third message to the source node, where the third message is used to indicate that a bandwidth adjustment error occurs; receive a fourth message and send the fourth message to the downstream node of the intermediate node; and receive a fifth message, and return the fifth message to the upstream node of the intermediate node.

The second bandwidth adjustment module 1402 is further configured to exit the adjustment mode corresponding to the OSU.

In some embodiments, the second communication module 1401 is further configured to:
  receive a fourth message and send the fourth message to the downstream node of the intermediate node; and
  receive a fifth message and return the fifth message to the upstream node of the intermediate node.

The second bandwidth adjustment module 1402 is further configured to:
  perform a second adjustment rollback operation on the forward transmission bandwidth parameter of the OSU, and exit the adjustment mode corresponding to the OSU.

In some embodiment, the third message includes at least one of the following items:
  A state indicates that the adjustment fails.
  A type indicates that the adjustment fails.
  Node information indicates that the adjustment fails.

In some embodiments, the second bandwidth adjustment module 1402 is further configured to:
  determine that there is a link failure after entering the adjustment mode and prior to exiting the adjustment mode, and exit the adjustment mode corresponding to the OSU.

In some embodiments, the second bandwidth adjustment module 1402 is further configured to:
  perform a second adjustment rollback operation on the forward transmission bandwidth parameter of the OSU.

In some embodiments, the second bandwidth adjustment module 1402 is configured to perform a second adjustment rollback operation on the forward transmission bandwidth parameter of the OSU by restoring the number of payload blocks corresponding to the OSU in a single forward transmission cycle.

The specific implementation process of the intermediate node is the same as that of the bandwidth adjustment method applied to the intermediate node side in the above embodiment, and will not be repeated here.

Figure 15:
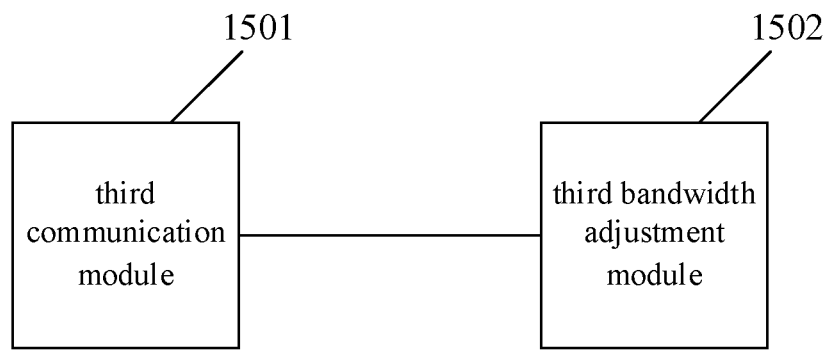
FIG. 15 is a block diagram showing composition of a sink node provided by another embodiment of the present disclosure.

FIG. 15 is a block diagram showing composition of a sink node provided in another embodiment of the present disclosure.

In a seventh aspect of the present disclosure, referring to FIG. 15, another embodiment of the present disclosure provides a sink node. The sink node includes the following modules.

A third communication module 1501 is configured to receive a first message and return a second message to an upstream node of the sink node.

A third bandwidth adjustment module 1502 is configured to enter an adjustment mode corresponding to an OSU and perform a third adjustment on a forward transmission bandwidth parameter of the OSU; and exit the adjustment mode corresponding to the OSU.

In some embodiments, the third bandwidth adjustment module 1502 is configured to perform a third adjustment on the forward transmission bandwidth parameter of the OSU in at least one of the following ways:
  checking a parameter of the first message;
  judging whether it is in a forward adjustment enabling state; or
  adjusting a bandwidth limitation of a forward sending interface.

In some embodiments, the third communication module 1501 is configured to return a second message to an upstream node of the sink node in the following ways:
  periodically returning the second message to the upstream node of the sink node; and stopping returning the second message to the upstream node of the sink node if the first message is not received within a preset time.

The third bandwidth adjustment module 1502 is further configured to exit the adjustment mode.

In some embodiments, the third communication module 1501 is further configured to:
  receive a fourth message, and return a fifth message to the upstream node of the sink node.

The third bandwidth adjustment module 1502 is further configured to:
  exit the adjustment mode corresponding to the OSU.

In some embodiments, the third communication module 1501 is further configured to:
  report an adjustment result to the network management server if the third adjustment fails, where the adjustment result is used to indicate that the adjustment fails; send a third message to the source node, where the third message is used to indicate that an adjustment error occurs; and receive a fourth message, and return a fifth message to the upstream node of the sink node.

The third bandwidth adjustment module 1502 is further configured to exit the adjustment mode corresponding to the OSU.

In some embodiment, the third message includes at least one of the following items.

A state indicates that the adjustment fails.
A type indicates that the adjustment fails.
Node information indicates that the adjustment fails.

In some embodiments, the third bandwidth adjustment module 1502 is further configured to:
determine that there is a link failure after entering the adjustment mode and prior to exiting the adjustment mode, perform a third adjustment rollback operation on the forward transmission bandwidth parameter of the OSU, and exit the adjustment mode corresponding to the OSU.

In some embodiments, the third bandwidth adjustment module 1502 is further configured to:
perform a third adjustment rollback operation on the forward transmission bandwidth parameter of the OSU.

In some embodiments, the third bandwidth adjustment module 1502 is configured to perform a third adjustment rollback operation on the forward transmission bandwidth parameter of the OSU in the following way: restoring, by the sink node, the bandwidth limitation of the forward sending interface. In some embodiments, the third communication module 1501 is further configured to:
send a sixth message to the upstream node of the sink node, where the sixth message is used to trigger an adjustment of a reverse transmission parameter of the OSU.

The specific implementation process of the sink node is the same as that of the bandwidth adjustment method applied to the sink node side in the above embodiment, and will not be repeated here.

In an eighth aspect of the present disclosure, another embodiment of the present disclosure provides a bandwidth adjustment system including: a source node, an intermediate node, and a sink node.

The source node is configured to receive an adjustment command issued by a network management server, enter an adjustment mode corresponding to an OSU, perform a first adjustment on a forward transmission bandwidth parameter of the OSU, and send a first message to a downstream node of the source node if the first adjustment is successful.

The intermediate node is configured to receive the first message, enter the adjustment mode corresponding to the OSU, perform a second adjustment on the forward transmission bandwidth parameter of the OSU, and forward the first message to a downstream node of the intermediate node if the second adjustment is successful.

The sink node is configured to receive the first message, enter the adjustment mode corresponding to the OSU, perform a third adjustment on the forward transmission bandwidth parameter of the OSU, and return a second message to an upstream node of the sink node if the third adjustment is successful.

The intermediate node is further configured to receive the second message, and return the second message to an upstream node of the intermediate node.

The source node is further configured to receive the second message, and exit the adjustment mode corresponding to the OSU.

The intermediate node is configured to exit the adjustment mode corresponding to the OSU.

The sink node is further configured to exit the adjustment mode corresponding to the OSU.

In some embodiments, the intermediate node is further configured to:
perform a fourth adjustment on the forward transmission bandwidth parameter of the OSU, and continue to perform the step of returning the second message to the upstream node of the intermediate node if the fourth adjustment is successful.

The source node is further configured to:
perform a fifth adjustment on the forward transmission bandwidth parameter of the OSU, and continue to perform the step of exiting the adjustment mode corresponding to the OSU if the fifth adjustment is successful.

In some embodiments, the source node is configured to perform a first adjustment on the forward transmission bandwidth parameter of the OSU in at least one of the following ways:
checking a parameter of the adjustment command;
detecting whether forward link bandwidth resources are sufficient;
determining whether it is in a forward adjustment enabling state;
adjusting the number of payload blocks corresponding to the OSU in a single forward transmission cycle;
reserving the adjusted number of the payload blocks; or
adjusting a forward transmission bandwidth of the OSU.

In some embodiments, the intermediate node is configured to perform a second adjustment on the forward transmission bandwidth parameter of the OSU in at least one of the following ways:
checking a parameter of the first message;
detecting whether forward link bandwidth resources are sufficient;
determining whether it is in a forward adjustment enabling state;
adjusting the number of payload blocks corresponding to the OSU in a single forward transmission cycle; or
reserving the adjusted number of the payload blocks.

In some embodiments, the sink node is configured to perform a third adjustment on the forward transmission bandwidth parameter of the OSU in at least one of the following ways:
checking a parameter of the first message;
judging whether it is in a forward adjustment enabling state; or
adjusting a bandwidth limitation of a forward sending interface.

In some embodiments, the intermediate node is configured to perform a fourth adjustment on the forward transmission bandwidth parameter of the OSU in at least one of the following ways:
checking a parameter of the second message;
detecting whether forward link bandwidth resources are sufficient;
determining whether it is in a forward transmission bandwidth adjustment enabling state; or
adjusting the number of payload blocks corresponding to the OSU in a single forward transmission cycle.

In some embodiments, the source node is configured to perform a fifth adjustment on the forward transmission bandwidth parameter of the OSU in at least one of the following ways:
checking a parameter of the second message;
detecting whether forward link bandwidth resources are sufficient;
determining whether it is a forward transmission bandwidth adjustment enabling state;

adjusting the number of payload blocks corresponding to the OSU in a single forward transmission cycle; or adjusting a forward transmission bandwidth of the OSU.

In some embodiments, the source node is configured to send a first message to a downstream node of the source node in the following mode: periodically sending the first message to the downstream node of the source node.

The sink node is configured to return a second message to an upstream node of the sink node in the following mode: periodically returning the second message to the upstream node of the sink node.

The source node is further configured to: stop sending the first message; and stop returning the second message to the upstream node of the sink node and exit the adjustment mode if not receiving the first message within a preset time.

The intermediate node is further configured to exit the adjustment mode if not receiving the second message within a preset time.

In some embodiments, the source node is further configured to:
 if the first adjustment or the fifth adjustment fails, report an adjustment result to the network management server, and exit the adjustment mode corresponding to the OSU, where the adjustment result is used to indicate that the adjustment fails.

In some embodiments, the intermediate node is further configured to:
 if the second adjustment or the fourth adjustment fails, report an adjustment result to the network management server, where the adjustment result is used to indicate that the adjustment fails; and send a third message to the source node, where the third message is used to indicate that a bandwidth adjustment error occurs.

The source node is further configured to:
 receive the third message, perform a first adjustment rollback operation on the forward transmission bandwidth parameter of the OSU, and send a fourth message to the downstream node of the source node.

The intermediate node is further configured to:
 receive the fourth message, and send the fourth message to the downstream node of the intermediate node.

The sink node is further configured to:
 receive the fourth message and return a fifth message to the upstream node of the sink node.

The intermediate node is further configured to:
 receive the fifth message and returns the fifth message to the upstream node of the intermediate node.

The source node is further configured to: receive the fifth message, and exit the adjustment mode corresponding to the OSU.

The intermediate node is further configured to exit the adjustment mode corresponding to the OSU.

The sink node is further configured to exit the adjustment mode corresponding to the OSU.

In some embodiments, the sink node is further configured to:
 if the third adjustment fails, report an adjustment result to the network management server, where the adjustment result is used to indicate that the adjustment fails; and send a third message to the source node, where the third message is used to indicate that an adjustment error occurs.

The source node is further configured to:
 receive the third message, perform a first adjustment rollback operation on the forward transmission bandwidth parameter of the OSU, and send a fourth message to the downstream node of the source node.

The intermediate node is further configured to:
 receive the fourth message, perform a second adjustment rollback operation on the forward transmission bandwidth parameter of the OSU, and send the fourth message to the downstream node of the intermediate node.

The sink node is further configured to:
 receive the fourth message, and return a fifth message to the upstream node of the sink node.

The intermediate node is further configured to: receive the fifth message, and return the fifth message to the upstream node of the intermediate node.

The source node is further configured to: receive the fifth message, and exit the adjustment mode corresponding to the OSU.

The intermediate node is configured to exit the adjustment mode corresponding to the OSU.

The sink node is further configured to exit the adjustment mode corresponding to the OSU.

In some embodiment, the third message includes at least one of the following items.

A state indicates that the adjustment fails.

A type indicates that the adjustment fails.

Node information indicates that the adjustment fails.

In some embodiments, the source node is further configured to:
 determine that there is a link failure after entering the adjustment mode and prior to exiting the adjustment mode, and exit the adjustment mode corresponding to the OSU.

The intermediate node is further configured to:
 determine that there is a link failure after entering the adjustment mode and prior to exiting the adjustment mode, and exit the adjustment mode corresponding to the OSU; and The sink node is further configured to:
 determine that there is a link failure after entering the adjustment mode and prior to exiting the adjustment mode, and exit the adjustment mode corresponding to the OSU.

In some embodiments, before the source node exits the adjustment mode corresponding to the OSU, the method further includes the following step. The source node is configured to perform a first adjustment rollback operation on the forward transmission bandwidth parameter of the OSU.

Before the intermediate node exits the adjustment mode corresponding to the OSU, the method further includes the following step. The intermediate node is configured to perform a second adjustment rollback operation on the forward transmission bandwidth parameter of the OSU; and Before the sink node exits the adjustment mode corresponding to the OSU, the method further includes the following step. The sink node is configured to perform a third adjustment rollback operation on the forward transmission bandwidth parameter of the OSU.

In some embodiments, the source node is configured to perform a first adjustment rollback operation on the forward transmission bandwidth parameter of the OSU in at least one of the following ways:
 restoring the number of payload blocks corresponding to the OSU in a single forward transmission cycle; or
 restoring the forward transmission bandwidth of the OSU.

In some embodiments, the intermediate node is configured to perform a second adjustment rollback operation on the forward transmission bandwidth parameter of the OSU in the following way:

restoring the number of payload blocks corresponding to the OSU in a single forward transmission cycle.

In some embodiments, the sink node is configured to perform a third adjustment rollback operation on the forward transmission bandwidth parameter of the OSU in the following way: restoring the bandwidth limitation of the forward sending interface.

In some embodiments, the sink node is further configured to:
    send a sixth message to the upstream node of the sink node, where the sixth message is used to trigger an adjustment of a reverse transmission parameter of the OSU.

The specific implementation process of the above-mentioned bandwidth adjustment system is the same as that of the bandwidth adjustment method applied to the system side in the above embodiment, and will not be repeated here.

According to the bandwidth adjustment method, when the source node receives an adjustment command issued by a network management server, all nodes on the path are triggered to adjust a forward transmission bandwidth parameter of the OSU respectively, so the network management server does not need to issue adjustment commands to all the nodes on the path, thereby simplifying the process of the bandwidth adjustment. Further, the source node enters an adjustment mode corresponding to the OSU, and sequentially sends the first message to the downstream node until the sink node, so that each node on the path enters the adjustment mode corresponding to OSU, and then exits the adjustment mode corresponding to the OSU after performing corresponding adjustment on the forward transmission bandwidth parameter of the OSU, thereby realizing a synchronous adjustment of all nodes on the path based on the adjustment mode corresponding to the OSU.

As will be understood by those having ordinary skills in the art that all or some of the steps, systems and functional modules/units in the apparatuses disclosed above may be implemented as software, firmware, hardware and appropriate combinations thereof. In the hardware implementation, the division between functional modules/units mentioned in the above description does not necessarily correspond to the division of physical components. For example, a physical component may have multiple functions, or a function or step may be cooperatively performed by multiple physical components. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skills in the art, the term "computer storage medium" includes volatile and nonvolatile, removable and non-removable media implemented in any method or technology for storing information such as computer readable instructions, data structures, program modules or other data. A computer storage medium may include RAM, ROM, EEPROM, flash memory or other memory technologies, CD-ROM, Digital Versatile Disk (DVD) or other optical disk storage, magnetic cassette, magnetic tape, magnetic disk storage or other magnetic storage devices, or any other media that can be used to store desired information and can be accessed by a computer. In addition, it is well known to those having ordinary skills in the art that the communication medium may generally include computer readable instructions, data structures, program modules or other data in a modulated data signal such as a carrier wave or other transmission mechanism, and may include any information delivery medium.

The example embodiments have been disclosed herein, and although specific terms are employed herein, the terms are only used and should only be interpreted in a generic and descriptive sense and not for purposes of limitation. In some instances, it is apparent to those having ordinary skills in the art that the features, characteristics and/or elements described in conjunction with specific embodiments can be used alone or in combination with those described in conjunction with other embodiments, unless otherwise explicitly stated. Therefore, it will be understood by those having ordinary skills in the art that various changes in form and details can be made without departing from the scope of the present disclosure as set forth in the appended claims.

What is claimed is:

1. A bandwidth adjustment method between a source node and a sink node connected to the source node through at least one intermediate node, comprising:
    receiving, by the source node, an adjustment command issued by a network management server, entering an adjustment mode corresponding to an Optical Service Unit (OSU), performing a first adjustment on a forward transmission bandwidth parameter of the OSU, and sending a first message to the intermediate node that is downstream and adjacent to the source node in response to the first adjustment being successful;
    receiving, by one of the at least one intermediate node, the first message, entering the adjustment mode corresponding to the OSU, performing a second adjustment on the forward transmission bandwidth parameter of the OSU, and forwarding the first message to the intermediate node or the sink node that is downstream and adjacent to the one of the at least one intermediate node in response to the second adjustment being successful;
    receiving, by a sink node, the first message, entering the adjustment mode corresponding to the OSU, performing a third adjustment on the forward transmission bandwidth parameter of the OSU, and returning a second message to the intermediate node that is upstream and adjacent to the sink node in response to the third adjustment being successful;
    receiving, by one of the at least one intermediate node, the second message, and returning the second message to the intermediate node or the source node that is upstream and adjacent to the one of the at least one intermediate node;
    receiving, by the source node, the second message, and exiting the adjustment mode corresponding to the OSU;
    exiting, by the at least one intermediate node, the adjustment mode corresponding to the OSU; and
    exiting, by the sink node, the adjustment mode corresponding to the OSU.

2. The bandwidth adjustment method of claim 1, wherein performing, by the source node, a first adjustment on a forward transmission bandwidth parameter of the OSU comprises at least one of:
    checking, by the source node, a parameter of the adjustment command;
    detecting, by the source node, whether forward link bandwidth resources are sufficient;
    determining, by the source node, whether the source node is in a forward adjustment enabling state;

adjusting, by the source node, the number of payload blocks corresponding to the OSU in a single forward transmission cycle;

reserving, by the source node, the adjusted number of the payload blocks; or adjusting, by the source node, a forward transmission bandwidth of the OSU.

3. The bandwidth adjustment method of claim 1, wherein that performing, by the one of the at least one intermediate node, a second adjustment on the forward transmission bandwidth parameter of the OSU comprises at least one of:

checking, by the one of the at least one intermediate node, a parameter of the first message;

detecting, by the one of the at least one intermediate node, whether forward link bandwidth resources are sufficient;

determining, by the one of the at least one intermediate node, whether the intermediate node is in a forward adjustment enabling state;

adjusting, by the one of the at least one intermediate node, the number of payload blocks corresponding to the OSU in a single forward transmission cycle; or reserving, by the one of the at least one intermediate node, the adjusted number of the payload blocks.

4. The bandwidth adjustment method of claim 1, wherein performing, by the sink node, a third adjustment on the forward transmission bandwidth parameter of the OSU comprises at least one of:

checking, by the sink node, a parameter of the first message;

determining, by the sink node, whether the sink node is in a forward adjustment enabling state; or adjusting, by the sink node, a bandwidth limitation of a forward sending interface.

5. The bandwidth adjustment method of claim 1, wherein after receiving, by one of the at least one intermediate node, the second message and prior to returning the second message to an upstream node of the intermediate node, the method further comprises:

performing, by one of the at least one intermediate node, a fourth adjustment on the forward transmission bandwidth parameter of the OSU, and returning the second message to the upstream node of the intermediate nod in response to the fourth adjustment being successful;

after receiving, by the source node, the second message and prior to exiting the adjustment mode corresponding to the OSU, the method further comprises:

performing, by the source node, a fifth adjustment on the forward transmission bandwidth parameter of the OSU, and exiting the adjustment mode corresponding to the OSU in response to the fifth adjustment being successful.

6. The bandwidth adjustment method of claim 5, wherein performing, by one of the at least one intermediate node, a fourth adjustment on the forward transmission bandwidth parameter of the OSU comprises at least one of:

checking, by one of the at least one intermediate node, a parameter of the second message;

detecting, by one of the at least one intermediate node, whether forward link bandwidth resources are sufficient;

determining, by one of the at least one intermediate node, whether the intermediate node is in a forward transmission bandwidth adjustment enabling state; or adjusting, by one of the at least one intermediate node, the number of payload blocks corresponding to the OSU in a single forward transmission cycle.

7. The bandwidth adjustment method of claim 5, wherein performing, by the source node, a fifth adjustment on the forward transmission bandwidth parameter of the OSU comprises at least one of:

checking, by the source node, a parameter of the second message;

detecting, by the source node, whether forward link bandwidth resources are sufficient;

determining, by the source node, whether the source node is in a forward transmission bandwidth adjustment enabling state;

adjusting, by the source node, the number of payload blocks corresponding to the OSUs in a single forward transmission cycle; or adjusting, by the source node, a forward transmission bandwidth of the OSU.

8. The bandwidth adjustment method of claim 1, wherein sending a first message to the intermediate node that is downstream and adjacent to source node comprises: periodically sending the first message to the intermediate node that is downstream and adjacent to the source node;

returning a second message to the intermediate node that is upstream and adjacent to the sink node comprises: periodically returning the second message to the intermediate node that is upstream and adjacent to the sink node;

after exiting, by the source node, the adjustment mode, the method further comprises: stopping, by the source node, sending the first message;

after returning, by the sink node, a second message to the intermediate node that is upstream and adjacent to the sink node, the method further comprises:

in response to the sink node not receiving the first message within a preset time, stopping, by the sink node, returning the second message to the intermediate node that is upstream and adjacent to the sink node, and exiting the adjustment mode; and after returning, by the intermediate node, the second message to the intermediate node or the source node that is upstream and adjacent to the intermediate node, the method further comprises:

in response to the intermediate node not receiving the second message within a preset time, exiting, by the intermediate node, the adjustment mode.

9. The bandwidth adjustment method of claim 1, wherein in response to a failure of the first adjustment or a failure of the fifth adjustment, the method further comprises:

reporting, by the at least one source node, an adjustment result to the network management server, and exiting the adjustment mode corresponding to the OSU, wherein the adjustment result is used to indicate that the adjustment fails.

10. The bandwidth adjustment method of claim 1, wherein in response to a failure of the second adjustment or a failure of the fourth adjustment failing, the method further comprises:

reporting, by at least one the intermediate node, an adjustment result to the network management server, wherein the adjustment result is used to indicate that the adjustment fails;

sending, by the at least one intermediate node, a third message to the source node, wherein the third message is used to indicate that a bandwidth adjustment error occurs;

receiving, by the source node, the third message, performing a first adjustment rollback operation on the forward transmission bandwidth parameter of the OSU, and sending a fourth message to the at least one intermediate node and the sink node;

receiving, by the at least one intermediate node, the fourth message, and sending the fourth message to the downstream intermediate node and the sink node of the at least one intermediate node;

receiving, by the sink node, the fourth message, and returning a fifth message to the intermediate node that is upstream and adjacent to the sink node;

receiving, by the intermediate node, the fifth message, and returning the fifth message to the at least one intermediate node or the source node that is upstream and adjacent to the intermediate node;

receiving, by the source node, the fifth message, and exiting the adjustment mode corresponding to the OSU;

exiting, by the at least one intermediate node, the adjustment mode corresponding to the OSU; and exiting, by the sink node, the adjustment mode corresponding to the OSU.

11. The bandwidth adjustment method of claim 1, wherein in response to a failure of the third adjustment, the method further comprises:

reporting, by the sink node, an adjustment result to the network management server, wherein the adjustment result is used to indicate that the adjustment fails;

sending, by the sink node, a third message to the source node, wherein the third message is used to indicate that an adjustment error occurs;

receiving, by the source node, the third message, performing a first adjustment rollback operation on the forward transmission bandwidth parameter of the OSU, and sending a fourth message to the intermediate node that is downstream and adjacent to the source node;

receiving, by the at least one intermediate node, the fourth message, performing a second adjustment rollback operation on the forward transmission bandwidth parameter of the OSU, and sending the fourth message to the at least one intermediate node or the sink node that is downstream and adjacent to the intermediate node;

receiving, by the sink node, the fourth message, and returning a fifth message to the intermediate node that is upstream and adjacent to the sink node;

receiving, by the at least one intermediate node, the fifth message, and returning the fifth message to the intermediate node or the source node that is upstream and adjacent to the intermediate node;

receiving, by the source node, the fifth message, and exiting the adjustment mode corresponding to the OSU;

exiting, by the at least one intermediate node, the adjustment mode corresponding to the OSU; and exiting, by the sink node, the adjustment mode corresponding to the OSU.

12. The bandwidth adjustment method of claim 10, wherein the third message comprises at least one of:

a state indicating that the adjustment fails;

a type indicating that the adjustment fails; or node information indicating that the adjustment fails.

13. The bandwidth adjustment method of claim 1, further comprising:

determining, by the source node, after entering the adjustment mode and prior to exiting the adjustment mode, a presence of a link failure, and exiting the adjustment mode corresponding to the OSU;

determining, by the intermediate node, after entering the adjustment mode and prior to exiting the adjustment mode, a presence of a link failure, and exiting the adjustment mode corresponding to the OSU; and determining, by the sink node, after entering the adjustment mode and prior to exiting the adjustment mode, a presence of a link failure, and exiting the adjustment mode corresponding to the OSU.

14. The bandwidth adjustment method of claim 13, wherein prior to exiting, by the source node, the adjustment mode corresponding to the OSU, the method further comprises:

performing, by the source node, a first adjustment rollback operation on the forward transmission bandwidth parameter of the OSU;

prior to exiting, by the intermediate node, the adjustment mode corresponding to the OSU, the method further comprises:

performing, by the intermediate node, a second adjustment rollback operation on the forward transmission bandwidth parameter of the OSU; and prior to exiting, by the sink node, the adjustment mode corresponding to the OSU, the method further comprises:

performing, by the sink node, a third adjustment rollback operation on the forward transmission bandwidth parameter of the OSU.

15. The bandwidth adjustment method of claim 10, wherein performing a first adjustment rollback operation on the forward transmission bandwidth parameter of the OSU comprises at least one of:

restoring, by the source node, the number of payload blocks corresponding to the OSU in a single forward transmission cycle; or restoring, by the source node, the forward transmission bandwidth of the OSU.

16. The bandwidth adjustment method of claim 11, wherein performing a second adjustment rollback operation on the forward transmission bandwidth parameter of the OSU comprises:

restoring, by the intermediate node, the number of payload blocks corresponding to the OSU in a single forward transmission cycle.

17. The bandwidth adjustment method of claim 14, wherein performing a third adjustment rollback operation on the forward transmission bandwidth parameter of the OSU comprises:

restoring, by the sink node, the bandwidth limitation of the forward sending interface.

18. The bandwidth adjustment method of claim 1, wherein after receiving, by the sink node, the first message, the method further comprises:

sending, by the sink node, a sixth message to the intermediate node and the source node that are upstream of the sink node, wherein the sixth message is used to trigger an adjustment of a reverse transmission parameter of the OSU.

19. A bandwidth adjustment system, comprising: a source node and a sink node connected to the source node through at least one intermediate node, wherein the source node is configured to receive an adjustment command issued by a network management server, enter an adjustment mode corresponding to an Optical Service Unit (OSU), perform a first adjustment on a forward transmission bandwidth parameter of the OSU, and send a first message to an intermediate node that is downstream and adjacent to the source node in response to the first adjustment being successful;

the at least one intermediate node is configured to receive the first message, enter the adjustment mode corresponding to the OSU, perform a second adjustment on the forward transmission bandwidth parameter of the OSU, and forward the first message to the intermediate node or the sink node that is downstream and adjacent to the at least one intermediate node in response to the second adjustment being successful;

a sink node is configured to receive the first message, enter the adjustment mode corresponding to the OSU, perform a third adjustment on the forward transmission bandwidth parameter of the OSU, and return a second message to the intermediate node that is upstream and adjacent to the sink node in response to the third adjustment being successful;

the at least one intermediate node is further configured to receive the second message, and return the second message to the intermediate node or the sink node that is upstream and adjacent to the at least one intermediate node;

the source node is further configured to receive the second message, and exit the adjustment mode corresponding to the OSU;

the at least one intermediate node is further configured to exit the adjustment mode corresponding to the OSU; and the sink node is further configured to exit the adjustment mode corresponding to the OSU.

20. The bandwidth adjustment system of claim 19, wherein the intermediate node is further configured to:

perform a fourth adjustment on the forward transmission bandwidth parameter of the OSU, and returning the second message to the upstream node of the intermediate node in response to the fourth adjustment being successful; and the source node is further configured to:

perform a fifth adjustment on the forward transmission bandwidth parameter of the OSU, and exiting the adjustment mode corresponding to the OSU in response to the fifth adjustment being successful.

* * * * *